US009385529B2

(12) United States Patent
Kanzaki et al.

(10) Patent No.: US 9,385,529 B2
(45) Date of Patent: Jul. 5, 2016

(54) POWER SUPPLY BRANCHING CONTROL APPARATUS AND METHOD FOR SUPPLYING POWER TO ELECTRIC LOADS

(71) Applicant: Mitsubishi Electric Corporation, Chiyoda-ku, Tokyo (JP)

(72) Inventors: Shozo Kanzaki, Chiyoda-ku (JP); Koji Hashimoto, Chiyoda-ku (JP); Tomohiro Kimura, Chiyoda-ku (JP)

(73) Assignee: Mitsubishi Electric Coporation, Tokyo (JP)

( * ) Notice: Subject to any disclaimer, the term of this patent is extended or adjusted under 35 U.S.C. 154(b) by 504 days.

(21) Appl. No.: 13/950,884

(22) Filed: Jul. 25, 2013

(65) Prior Publication Data

US 2014/0239713 A1    Aug. 28, 2014

(30) Foreign Application Priority Data

Feb. 28, 2013    (JP) ................. 2013-038258

(51) Int. Cl.
*H02J 3/00* (2006.01)
*H02J 1/00* (2006.01)
*H02H 11/00* (2006.01)

(52) U.S. Cl.
CPC ............. *H02J 1/00* (2013.01); *H02H 11/002* (2013.01); *H02H 11/003* (2013.01); *Y10T 307/25* (2015.04); *Y10T 307/839* (2015.04); *Y10T 307/865* (2015.04)

(58) Field of Classification Search
CPC ....... H02J 1/00; H02H 11/002; H02H 11/003; Y10T 307/25; Y10T 307/839
See application file for complete search history.

(56) References Cited

U.S. PATENT DOCUMENTS

| 2003/0081365 | A1* | 5/2003 | He ................. H02H 11/003 361/82 |
| 2007/0268048 | A1 | 11/2007 | Komatsu et al. |
| 2010/0148733 | A1* | 6/2010 | Koeppl ............. H02H 7/0844 323/225 |
| 2011/0234177 | A1 | 9/2011 | Kohara et al. |

(Continued)

FOREIGN PATENT DOCUMENTS

| JP | 09-261861 | 10/1997 |
| JP | 10-126963 A | 5/1998 |
| JP | 2007-082374 A | 3/2007 |

(Continued)

OTHER PUBLICATIONS

Japanese Office Action dated Dec. 17, 2013 in Japanese Patent Application No. 2013-038258.

*Primary Examiner* — Daniel Cavallari
(74) *Attorney, Agent, or Firm* — Sughrue Mion, PLLC

(57) ABSTRACT

Power supply current is supplied to a plurality of electric loads, the power supply current being generated by a DC power supply, flowing in and branching from a shared power supply switching device and then flowing in reverse connection protection devices that are a field-effect transistor and connected in series to the electric loads, respectively. The reverse connection protection devices are connected in a polarity such that the power supply current flows in the forward direction of parasitic diodes generated between the source terminal S and the drain terminal D of the field-effect transistor. When the current in the field-effect transistor is less than a predetermined value, a gate control circuit interrupts the gate voltage of the reverse connection protection device to cause the reverse connection protection device to open.

6 Claims, 10 Drawing Sheets

(56) References Cited

U.S. PATENT DOCUMENTS

2012/0293018 A1* 11/2012 Cruz .................... H02H 11/002
307/127
2013/0029527 A1* 1/2013 Mullins .................. H01R 24/60
439/620.21

FOREIGN PATENT DOCUMENTS

| JP | 2007-312572 | 11/2007 |
|---|---|---|
| JP | 2008-029195 | 2/2008 |
| JP | 2011-155784 | 8/2011 |
| JP | 2011-211761 | 10/2011 |

* cited by examiner

904 INDIRECT SUPPLY FAULT DETECTION UNIT
906 FORCIBLE CLOSING INSTRUCTION UNIT

FIG. 10

| | | SWITCHING INSTRUCTION SIGNALS DR1 AND DR2 INSTRUCTION TO OPEN | SWITCHING INSTRUCTION SIGNALS DR1 AND DR2 INSTRUCTION TO CLOSE | |
|---|---|---|---|---|
| LOAD SWITCHING DEVICE DOWNSTREAM POSITION FIG. 1 | CURRENT DETECTION VOLTAGE Vdif EXCESSIVELY SMALL | NORMAL OR SAME AS ON THE RIGHT | POSITIVE-WIRE SUPPLY FAULT ABNORMALITY LOAD SWITCHING DEVICE DISCONNECTION ELECTRIC LOAD DISCONNECTION (NEGATIVE-WIRE SUPPLY FAULT, OVERCURRENT BLOCKING) | UPPER ROW 1 |
| | CURRENT DETECTION VOLTAGE Vdif LARGE | NEGATIVE-LINE GROUND FAULT ABNORMALITY LOAD SWITCHING DEVICE SHORT CIRCUIT | ELECTRIC LOAD INCOMPLETE SHORT CIRCUIT | UPPER ROW 2 |
| | CURRENT DETECTION VOLTAGE Vdif EXCESSIVELY LARGE | (POSITIVE-LINE GROUND FAULT, OVERCURRENT BLOCKING) | (POSITIVE-LINE GROUND FAULT, OVERCURRENT BLOCKING) (ELECTRIC LOAD SHORT CIRCUIT, OVERCURRENT BLOCKING) | UPPER ROW 3 |
| LOAD SWITCHING DEVICE UPSTREAM POSITION FIGS. 3 AND 5 | CURRENT DETECTION VOLTAGE Vdif EXCESSIVELY SMALL | NORMAL OR SAME AS ON THE RIGHT | POSITIVE-WIRE SUPPLY FAULT ABNORMALITY LOAD SWITCHING DEVICE DISCONNECTION ELECTRIC LOAD DISCONNECTION | LOWER ROW 1 |
| | CURRENT DETECTION VOLTAGE Vdif LARGE | LOAD SWITCHING DEVICE SHORT CIRCUIT | ELECTRIC LOAD INCOMPLETE SHORT CIRCUIT | LOWER ROW 2 |
| | CURRENT DETECTION VOLTAGE Vdif EXCESSIVELY LARGE | (MULTIPLE ABNORMALITIES, OVERCURRENT BLOCKING) | (POSITIVE-LINE GROUND FAULT, OVERCURRENT BLOCKING) (ELECTRIC LOAD SHORT CIRCUIT, OVERCURRENT BLOCKING) | LOWER ROW 3 |
| | | LEFT COLUMN | RIGHT COLUMN | | ically, one of the power supply switching devices selectively supplying power to one or more of the in-vehicle electric loads. For example, according to FIG. 6 in Patent Literature 1, "In-vehicle power supply distribution apparatus", a field-effect transistor 44A that is an intelligent power switch is used as a power supply switching device in place of an output contact of a magnetic relay. On the other hand, a technique is widely used in which a reverse connection protection diode is connected in series to an electric load powered by a DC power supply so that load current will not flow when the power supply is connected in wrong polarity. A field-effect transistor as a reverse connection protection device is widely used in order to reduce voltage drop and temperature increase caused by a reverse connection protection device in normal operation. Note that the field-effect transistor mentioned herein includes a P-channel type and an N-channel type, in any case of which, as far as the power supply is connected in correct polarity, the field-effect transistor is caused to close so as to be conductive in the same direction as the conduction direction of an internal parasitic diode.

For example, according to FIG. 4 in Patent Literature 2, "Power supply reverse connection protection circuit", in an ECU 45 powered by a battery 3, an N-channel type FET 21 is provided on a power supply wire 15 connecting a power supply terminal 5 connected to the positive terminal of the battery 3 and a control circuit 13 to be powered, with the anode of a parasitic diode D1 of the FET 21 on the power supply terminal 5 side, and furthermore, an N-channel type FET 22 is provided on the downstream side of the FET 21, with the cathode of a parasitic diode D2 of the FET 22 on the FET 21 side. Then, when an ignition key switch 9 is turned on with the battery 3 correctly connected, charge pump circuits 43, 47 powered from the drain side of the FET 21 turns on the FETs 21, 22, causing the control circuit 13 to be powered by the battery 3. On the other hand, when the battery 3 is connected in reverse polarity, the FETs 21, 22 are turned off and reverse current is interrupted by the parasitic diode D1.

When powered by the battery 3 after the FET 22 is turned on, the control circuit 13 starts operation by outputting a drive signal Sd so that the FETs 21, 22 will be kept on even when the ignition key switch 9 is turned off. Also, although not shown, the control circuit 13 monitors the voltage of a signal input terminal 11 in order to detect the on/off state of the ignition key switch 9. Then the control circuit 13 detects that the ignition key switch 9 is turned off, based on the voltage of the signal input terminal 11, and then, when a preprocessing for operation stop, such as data migration, ends and a condition for allowing operation stop is satisfied, stops outputting the drive signal Sd.

[Patent Literature 1] JP-A-10-126963 (FIG. 1, Abstract, FIG. 6, [0025])
[Patent Literature 2] JP-A-2007-082374 (FIG. 4, Abstract, FIG. 1, [0056], [0057])

According to Patent Literature 1, a field-effect transistor that is an intelligent power switch is used as a power supply switching device. Accordingly, when overcurrent flows in the power supply switching device due to abnormality of an electric load or load wiring, the power supply switching device can be opened for protection. However, when an in-vehicle battery is connected in wrong power-supply polarity, a problem is caused in which short circuit current flows in a parasitic diode generated in the field-effect transistor, thereby damaging the power supply switching device or a related device connected thereto by overheat. On the other hand, according to Patent Literature 2, a reverse connection protection device and a power supply switching device are used as one composite switching device, resolving the problem of connection in wrong power-supply polarity. However, a problem is caused in which providing one composite switching device to every one of a plurality of electric loads may be uneconomical.

SUMMARY OF THE INVENTION

It is a first object of the present invention to provide a power supply branching control apparatus and method for supplying power to electric loads so that, for a plurality of electric loads powered through a power supply switching device and a reverse connection protection device, a plurality of the reverse connection protection devices can be connected to and branched from the power supply switching device that is shared by the reverse connection protection devices. It is a second object of the invention to provide a power supply branching control apparatus and method for supplying power to electric loads so that, when a supply fault accident occurs in which the positive-side wire of one electric load is in fault contact with the positive-pole wire of a DC power supply, the other electric load can be prevented from being wraparound-powered.

The power supply branching control apparatus for supplying power to electric loads according to the invention is a power supply branching control apparatus for supplying power to electric loads, including: first and second reverse connection protection devices connected in series to the respective upstream positions of first and second electric loads connected to and branched from, and powered by a shared power supply switching device connected to the positive-side terminal of a DC power supply; load switching devices also connected in series to the first and second electric loads, respectively; and control circuits for supplying power supply current to the first and second electric loads through the power supply switching device, the first and second reverse connection protection devices and the load switching devices, wherein the first and second reverse connection protection devices include: a P- or N-channel type field-effect transistor that is connected in a polarity such that the power supply current flows in the forward direction of parasitic diodes generated between the source terminal S and the drain terminal D of the field-effect transistor; and a gate control circuit for controlling the conduction between the source terminal S and the drain terminal D, and wherein the gate control circuit or the control circuit includes an analog comparator or digital comparison unit so that, when the power supply current flowing in the field-effect transistor in which the parasitic diode is generated is equal to or more than a predetermined threshold current, the analog comparator or digital comparison unit controls gate voltage applied between the source terminal S and the gate terminal G so as to cause the field-effect transistor to close, and when the power supply current is less than the predetermined threshold current or at least when the voltage between the source terminal S and the drain terminal D is in a polarity in the reverse direction of the parasitic diode, the analog comparator or digital comparison unit causes the gate voltage to be interrupted and the field-effect transistor to be not conductive.

A power supply branching control method for supplying power to electric loads according to the invention is such that: control circuits are provided for controlling power supply current supplied to first and second electric loads, the power supply current being generated by a DC power supply, flowing in and branching from a shared power supply switching device and then flowing in first and second reverse connection protection devices and load switching devices that are P- or N-channel type field-effect transistors; and the control circuits include microprocessors that work with RAM memories, nonvolatile program memories, nonvolatile data memories and multi-channel A/D converters, wherein current detection voltages Vdif proportional to power supply current flowing in the first and second reverse connection protection devices to the first and second electric loads are input to the microprocessors through the multi-channel A/D converters; and wherein the microprocessors work with the gate control circuit of the first and second reverse connection protection devices to control gate voltage applied between the source terminal S and the gate terminal G of the field-effect transistors so that, when the power supply current flowing in the field-effect transistors is equal to or more than a predetermined threshold current, the field-effect transistors are caused to close, and when the power supply current is less than the predetermined threshold current or at least when the voltage between the source terminal S and the drain terminal D is in a polarity in the reverse direction of the parasitic diodes generated in the field-effect transistors, the gate voltage is interrupted and the field-effect transistors are caused to be not conductive.

According to the power supply branching control apparatus for supplying power to electric loads according to the invention, the power supply current is supplied to the plurality of electric loads, the power supply current being generated by the DC power supply, flowing in and branching from the shared power supply switching device and then flowing in the reverse connection protection devices that are a field-effect transistor and connected in series to the electric loads, respectively, and when the power supply current flowing in the field-effect transistors is less than the predetermined threshold current or at least when the voltage between the source terminal S and the drain terminal D of the field-effect transistors is in a polarity in the reverse direction of the parasitic diodes, the gate control circuits or the control circuits interrupt the gate voltage of the reverse connection protection devices to cause the reverse connection protection devices to open.

Furthermore, according to the power supply branching control method for supplying power to electric loads according to the invention, the power supply current is supplied to the plurality of electric loads, the power supply current being generated by the DC power supply, flowing in and branching from the shared power supply switching device and then flowing in the reverse connection protection devices that are a field-effect transistor and connected in series to the electric loads, respectively, and when the power supply current flowing in the field-effect transistors is less than the predetermined threshold current or at least when the voltage between the source terminal S and the drain terminal D of the field-effect transistors is in a polarity in the reverse direction of the parasitic diodes, the microprocessors work with the gate control circuits to interrupt the gate voltage of the reverse connection protection devices to cause the reverse connection protection devices to open.

Thus, in comparison with one using a series connection to one pair of power supply switching device and reverse connection protection device for one electric load, the more the number of electric loads, the smaller the number of power supply switching devices are used, which allows a heat sink mechanism of the power supply switching devices to be simplified, and accordingly compact and low-cost.

Furthermore, when a supply fault accident occurs in which the output-side wire of a reverse connection protection device is in fault contact with the positive-pole wire of a DC power supply, the reverse connection protection device is caused to open to prevent a wraparound power supply to another branch circuit, so the live-wire area due to the supply fault accident will not spread when the power supply switching device is opened, allowing the number of power supply switching devices to be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a list of abnormality determination items for FIGS. 1, 3 and 5.

DETAILED DESCRIPTION OF THE PREFERRED EMBODIMENTS

First Embodiment (1) Detailed Description of Configuration

Figure 1:
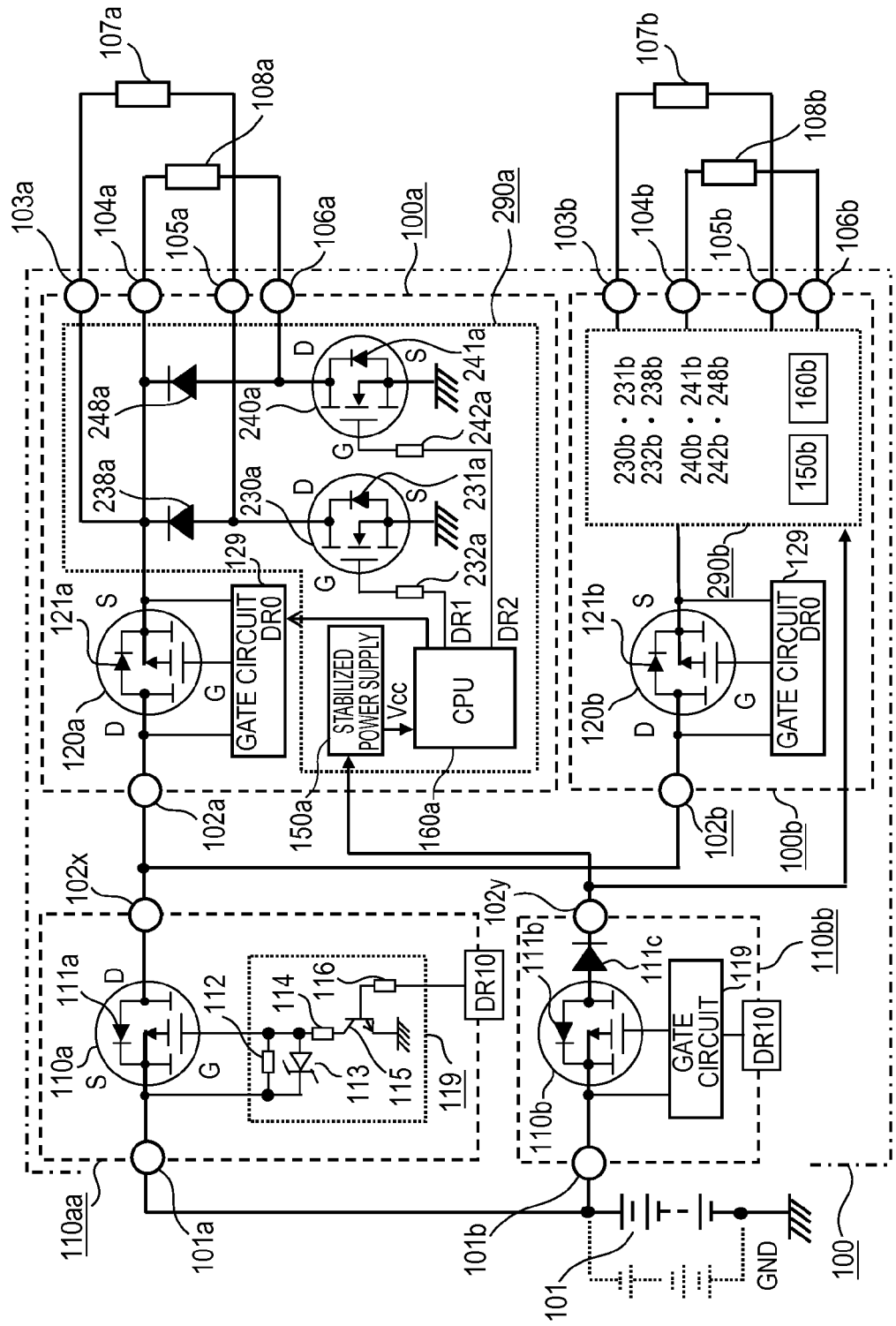
FIG. 1 is an overall circuit diagram of a power supply branching control apparatus for supplying power to electric loads in accordance with a first embodiment of the invention.
Figure 2:
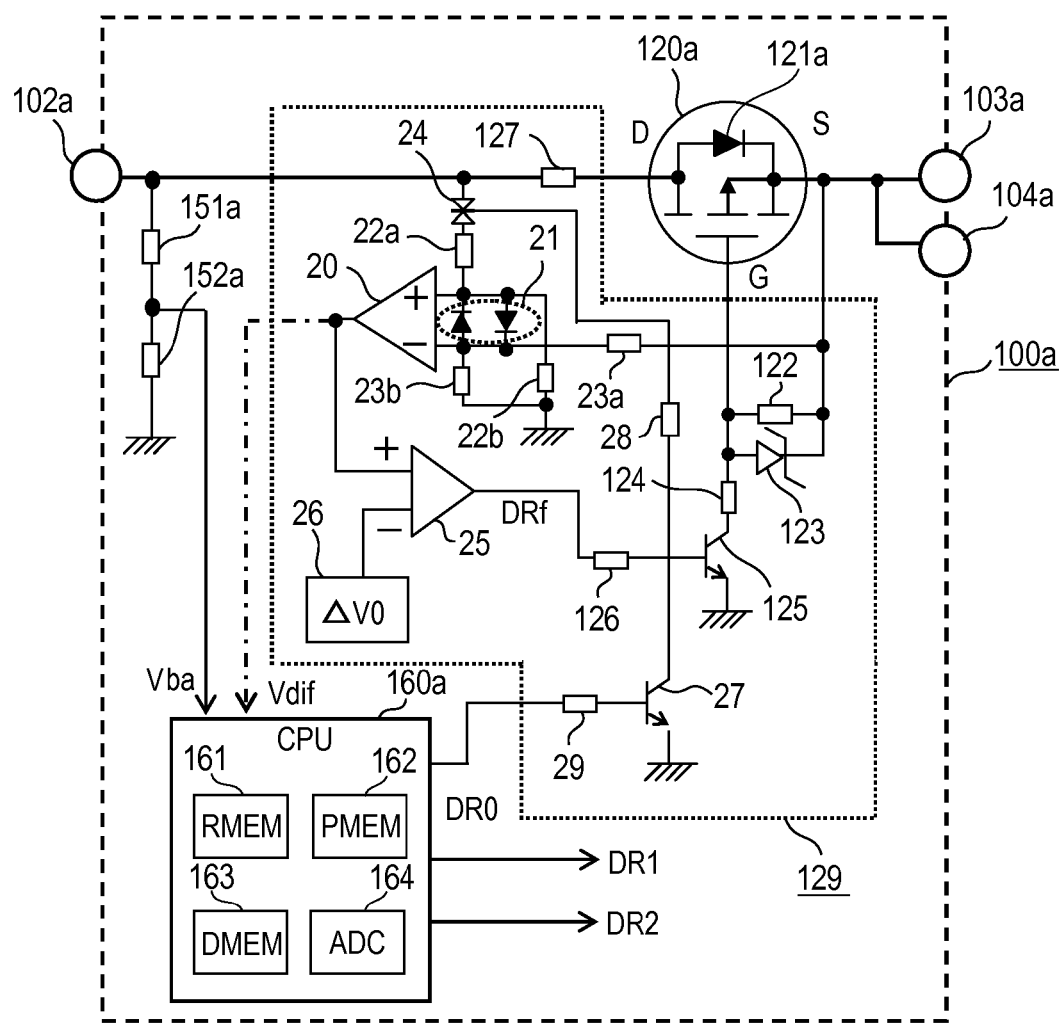
FIG. 2 is a detailed control circuit diagram of a portion of FIG. 1.

The configuration of a power supply branching control apparatus for supplying power to electric loads in accordance with a first embodiment of the invention is described in detail with reference to FIGS. 1 and 2. FIG. 1 is an overall circuit diagram of the apparatus. FIG. 2 is a detailed control circuit diagram of a gate control circuit 129 in FIG. 1. In FIG. 1, a power supply branching control apparatus 100 includes: a power supply/distribution controller 110*aa*, powered by a DC power supply 101 that is, for example, an in-vehicle battery, for performing divided power distribution for a plurality of electric loads; first and second power supply branching controllers 100*a* and 100*b*; and a power supply controller 110*bb* for supplying power to stabilized power supplies 150*a* and 150*b* provided in the first and second power supply branching controllers 100*a* and 100*b*. The first power supply branching controller 100*a* supplies power to first electric loads 107*a* and 108*a* including a plurality of electric loads. The second power supply branching controller 100*b* supplies power to second electric loads 107*b* and 108*b* including a plurality of electric loads. The power supply/distribution controller 110*aa* includes: a main power supply terminal 101*a* connected to the positive-pole terminal of the DC power supply 101; and a power supply switching device 110*a*, which is, for example, a P-channel type field-effect transistor, connected between the main power supply terminal 101*a* and a power distribution terminal 102*x*. In the power supply switching device 110*a*, a parasitic diode 111*a* is connected in the polarity direction for interrupting discharge from the DC power supply 101, and when gate voltage is applied between the source terminal S and the gate terminal G by a power supply control gate circuit 119 described later, conduction is provided between the source terminal S and the drain terminal D in the direction opposite to the forward direction of the parasitic diode 111*a*, causing power supply current to flow in the first and second electric loads 107*a* and 108*a*, and 107*b* and 108*b*.

In the power supply/distribution controller 110*aa*, a plurality of power supply switching devices not shown are provided and supply power to other electric loads through a plurality of power distribution terminals 102*x*, and fuses not shown are appropriately connected in series to the power distribution lines. In the power supply control gate circuit 119, a gate resistor 112 and a voltage regulator diode 113, connected in parallel to each other, are connected between the source terminal S and the gate terminal G of the power supply switching device 110*a*, and the gate terminal G is connected to a ground circuit GND through a drive resistor 114 and a power supply support transistor 115 that is an NPN type transistor. When a power supply instruction signal DR10 generated by a power supply/distribution control circuit not shown has a logic level "H" due to, for example, a power switch not shown being closed, the signal DR10 causes, through a base resistor 116, the power supply support transistor 115 to be conductive, then as a result, the voltage divided by the gate resistor 112 and the drive resistor 114 is limited by the voltage regulator diode 113 and applied as gate voltage between the source terminal S and the gate terminal G of the power supply switching device 110*a*. The power supply controller 110*bb* includes: a main power supply terminal 101*b* connected to the positive-pole terminal of the DC power supply 101; and a power supply switching device 110*b*, which is, for example, a P-channel type field-effect transistor, connected between the main power supply terminal 101*b* and a power distribution terminal 102*y*. In the power supply switching device 110*b*, a parasitic diode 111*b* is connected in the polarity direction for interrupting discharge from the DC power supply 101, and when gate voltage is applied between the source terminal S and the gate terminal G by the previously-described power supply control gate circuit 119, conduction is provided between the source terminal S and the drain terminal D in the direction opposite to the forward direction of the parasitic diode 111*b*, causing the stabilized power supplies 150*a* and 150*b* to be powered through a reverse connection protection diode 111*c*.

The first power supply branching controller 100*a* includes: a first branch terminal 102*a* connected to the power distribution terminal 102*x* of the power supply/distribution controller 110*aa*; and a reverse connection protection device 120*a*, which is, for example, a P-channel type field-effect transistor, connected between the first branch terminal 102*a* and first load terminals 103*a* and 104*a*. In the reverse connection protection device 120*a*, a parasitic diode 121*a* is connected in the polarity direction the same as the direction in which power supply current for the first electric loads 107*a* and 108*a* flows, and when gate voltage is applied between the source terminal S and the gate terminal G by a gate control circuit 129 described later, conduction is provided between the drain terminal D and the source terminal S in the same direction as the forward direction of the parasitic diode 121*a*, causing power supply current to flow in the plurality of first electric loads 107*a* and 108*a*. Load switching devices 230*a* and 240*a* are connected between first load terminals 105*a* and 106*a* connected to the negative-side terminals of the plurality of the first electric loads 107*a* and 108*a* and the ground circuit GND, respectively. Note that the load switching devices 230*a* and 240*a* are, for example, N-channel type field-effect transistors, and between the drain terminal D and the source terminal S of the transistors, parasitic diodes 231*a* and 241*a* are generated in the polarity such that power supply currents for the first electric loads 107*a* and 108*a* do not flow in the parasitic diodes 231*a* and 241*a*.

A stabilized power supply 150*a* provided in the first power supply branching controller 100*a* is powered through the power distribution terminal 102*y* to generate a control voltage Vcc that is a predetermined stabilized voltage and supply power to a control circuit 160*a* provided in the first power supply branching controller 100*a*. The control circuit 160*a* applied with the control voltage Vcc generates switching instruction signals DR1 and DR2 in response to the operating state of input signals not shown to apply gate voltage between the gate terminal G and the source terminal S of the load switching devices 230*a* and 240*a* through gate resistors 232*a* and 242*a* so that conduction will be provided between the drain terminal D and the source terminal S of the load switching devices 230*a* and 240*a*. Note that, when the first electric loads 107*a* and 108*a* are inductive loads, commutation diodes 238*a* and 248*a* are connected in parallel to the first electric loads 107*a* and 108*a* so that power supply current flowing due to the load switching devices 230*a* and 240*a* being closed will be commutated to the commutation diodes 238*a* and 248*a* and attenuated when the load switching devices 230*a* and 240*a* are opened. However, if the power supply current needs to be rapidly attenuated when the load switching devices 230*a* and 240*a* are opened, the commutation diodes 238*a* and 248*a* are not provided and high voltage will be generated across the load switching devices 230*a* and 240*a* based on the voltage limitation function of the parasitic diodes 231*a* and 241*a*. The stabilized power supply 150*a*, the control circuit 160*a* and the load switching devices 230*a* and 240*a* are collectively referred to as a load drive control circuit 290*a*.

The second power supply branching controller 100*b*, which is connected to the DC power supply 101 through the power supply switching device 110*a*, the power distribution terminal 102*x* and a second branch terminal 102*b* and supplies power to the second electric loads 107*b* and 108*b*, is similarly configured, i.e., includes: a load drive control circuit 290*b* as which a control circuit 160*b* that operates on a control voltage Vcc supplied by a stabilized power supply 150b and load switching devices 230b and 240b are collectively referred to; a second reverse connection protection device 120b including a parasitic diode 121b; and a gate control circuit 129 described later with reference to FIG. 2.

Note that the first power supply branching controller 100a and the second power supply branching controller 100b may be integrated, in which the stabilized power supplies 150a and 150b may also be integrated, and the control circuits 160a and 160b may also be integrated. Also, the power supply switching device 110a in the power supply/distribution controller 110aa may also be provided within the first and second power supply branching controllers that are integrated. In this case, the integrated power supply branching controller will take a configuration in which the plurality of reverse connection protection devices 120a, 120b and so on are connected to and branched from the shared power supply switching device 110a, instead of taking a configuration in which a separate power supply switching device is provided for each of a plurality of reverse connection protection devices.

For the reverse connection protection devices 120a and 120b that are P-channel type field-effect transistors, when a predetermined gate voltage with a polarity such that the potential of the gate terminal G is lower than that of the source terminal S is applied, conduction is provided between the drain terminal D and the source terminal S such that current flows from the higher-potential side of the drain terminal D and the source terminal S to the lower-potential side. When the gate voltage becomes equal to or less than a predetermined value, the conduction between the drain terminal D and the source terminal S is interrupted, but current flow from the drain terminal D to the source terminal S cannot be interrupted because the parasitic diodes 121a and 121b are connected in parallel between the drain terminal D and the source terminal S. On the other hand, for the load switching devices 230a and 240a, and 230b and 240b that are N-channel type field-effect transistors, when a predetermined gate voltage with a polarity such that the potential of the gate terminal G is higher than that of the source terminal S is applied, conduction is provided between the drain terminal D and the source terminal S such that current flows from the higher-potential side of the drain terminal D and the source terminal S to the lower-potential side. When the gate voltage becomes equal to or less than a predetermined value, the conduction between the drain terminal D and the source terminal S is interrupted, but current flow from the source terminal S to the drain terminal D cannot be interrupted because the parasitic diodes 231a and 241a, and 231b and 241b are connected in parallel between the drain terminal D and the source terminal S.

Next, referring to FIG. 2, the gate control circuit 129 applied to the first reverse connection protection device 120a in the first power supply branching controller 100a is described in detail. Note that the gate control circuit 129 applied to the second reverse connection protection device 120b in the second power supply branching controller 100b is similar to the one shown in FIG. 2. In the gate control circuit 129 in FIG. 2, a gate resistor 122 and a voltage regulator diode 123, connected in parallel to each other, are connected between the source terminal S and the gate terminal G of the first reverse connection protection device 120a, and the gate terminal G is connected to the ground circuit GND through a drive resistor 124 and a drive transistor 125 that is an NPN type transistor. When an analog comparator 25 described later outputs a current determination signal DRf having a logic level "H", the drive transistor 125 is caused, through a base resistor 126, to be conductive, then as a result, the voltage divided by the gate resistor 122 and the drive resistor 124 is limited by the voltage regulator diode 123 and applied as gate voltage between the source terminal S and the gate terminal G of the first reverse connection protection device 120a. A current detection resistor 127 is connected in series to the drain terminal D or source terminal S of the first reverse connection protection device 120a, and the voltage across the series connection of the first reverse connection protection device 120a and the current detection resistor 127 is amplified by a differential amplifier 20 that generates a current detection voltage Vdif proportional to current flowing in the first reverse connection protection device 120a.

The differential amplifier 20 has a pair of input terminals, the input voltage of which is limited by a pair of clip diodes 21 and 21 connected in parallel and opposite to each other between the input terminals, the positive input terminal being connected to an input resistor 22a connected to the upstream position of the current detection resistor 127 through a leakage current interrupting device 24, the negative input terminal being connected to an input resistor 23a connected to the source terminal S (downstream position) of the first reverse connection protection device 120a. Also, pull-down resistors 22b and 23b are connected to the respective input terminals in order to define the potentials of the input terminals when the leakage current interrupting device 24 is opened. The analog comparator 25 compares the current detection voltage Vdif generated by the differential amplifier 20 to a determination threshold voltage $\Delta V0$ that is a reference voltage generated by a reference voltage generation circuit 26, and, when Vdif $\geq \Delta V0$, outputs the current determination signal DRf having a logic level "H", causing, through the base resistor 126, the drive transistor 125 to close. The control circuit 160a includes a microprocessor that works with: a RAM memory 161 for processing; a nonvolatile program memory 162 that is, for example, a flash memory; a nonvolatile data memory 163 that is a portion of the nonvolatile program memory or divided from and connected to the nonvolatile program memory; and a multi-channel A/D converter 164.

The power supply voltage of the DC power supply 101 applied to the first branch terminal 102a through the power supply switching device 110a is divided by voltage division resistors 151a and 152a to be input to the multi-channel A/D converter 164 as a measured power supply voltage Vba. Desirably, the current detection voltage Vdif that is the output voltage of the differential amplifier 20 is also input to the multi-channel A/D converter 164 in order to utilize an abnormality determination unit 805 described later with reference to FIG. 8. The leakage current interrupting device 24 is caused, through a drive resistor 28, to close when a support transistor 27 is closed. A base resistor 29 for driving the support transistor 27 is connected to an energization instruction signal DR0 generated by the control circuit 160a. The control circuit 160a also generates the switching instruction signals DR1 and DR2 in response to the operating state of input signals not shown to switching-control the load switching devices 230a and 240a in the load drive control circuit 290a in FIG. 1. The control circuit 160b provided in the second power supply branching controller 100b is similarly configured and generates the switching instruction signals DR1 and DR2 in response to the operating state of input signals not shown to switching-control the load switching devices 230b and 240b in the load drive control circuit 290b in FIG. 1.

(2) Detailed Description of Effect and Operation

Next, the effect and operation of the power supply branching control apparatus according to the first embodiment of the invention, configured as shown in FIGS. 1 and 2, is described in detail. First, in FIG. 1, for example, when a power switch not shown is closed to generate the power supply instruction signal DR10, the power supply switching device 110a is caused, through the power supply support transistor 115, to close, thereby providing the power supply voltage of the DC power supply 101 to the first and second branch terminals 102a and 102b provided in the first and second power supply branching controllers 100a and 100b. Similarly, the power supply switching device 110b is caused, through the power supply support transistor 115, to close, thereby providing the power supply voltage of the DC power supply 101 to the power distribution terminal 102y through the reverse connection protection diode 111c. As a result, when the stabilized power supplies 150a and 150b in the first and second power supply branching controllers 100a and 100b generate the control voltage Vcc and the control circuits 160a and 160b generate the energization instruction signal DR0, the gate control circuits 129 for the first and second reverse connection protection devices 120a and 120b start operation as described later with reference to FIG. 2. When the control circuits 160a and 160b generate the switching instruction signals DR1 and DR2 in response to the operating state of input signals not shown, thereby causing any of the load switching devices 230a and 240a, and 230b and 240b to close, any of the first and second electric loads 107a and 108a, and 107b and 108b connected to the closed load switching device will be powered and driven.

When a positive-line ground fault abnormality occurs in which the positive-side wire of any of the first and second electric loads 107a and 108a, and 107b and 108b is in fault contact with the ground circuit GND, overcurrent flows in the power supply switching device 110a and the reverse connection protection device 120a, but, if the power supply switching device 110a has an overcurrent interrupting function, the circuit devices and wires can be prevented from being burnt. When the power supply switching device 110a is in an overcurrent interrupting mode, the current control function for the first and second electric loads 107a and 108a, and 107b and 108b will be lost. However, since the power supply switching device 110b still supplies power to the control circuits 160a and 160b, the overall control function will not be lost. Furthermore, when a negative-line supply fault abnormality occurs in which the negative-side wire of any of the first and second electric loads 107a and 108a, and 107b and 108b is in fault contact with the power supply line, overcurrent flows in corresponding one of the load switching devices 230a and 240a, and 230b and 240b, but, if the load switching devices 230a and 240a, and 230b and 240b have an overcurrent interrupting function, the circuit devices and wires can be prevented from being burnt. Similarly, when an internal short circuit or a short circuit abnormality in which the positive-side wire is in fault contact with the negative-side wire occurs in any of the first and second electric loads 107a and 108a, and 107b and 108b, if the power supply switching device 110a and the load switching devices 230a and 240a, and 230b and 240b have an overcurrent interrupting function, the circuit devices and wires can be prevented from being burnt.

On the other hand, when a positive-line supply fault abnormality occurs in which the positive-side wire of any of the first and second electric loads 107a and 108a, and 107b and 108b is in fault contact with the power supply line of the DC power supply 101, for example, when the positive-side wire of the first electric load 107a is in fault contact with the positive-pole wire of the DC power supply 101 and the power supply switching device 110a is opened, if the first reverse connection protection device 120a is conductive in the direction from the source terminal S to the drain terminal D, the supply fault power supply may wraparound toward the second reverse connection protection device 120b, which may enable the second electric loads 107b and 108b to be powered. However, in the first reverse connection protection device 120a, when current flowing from the drain terminal D to the source terminal S becomes equal to or less than a predetermined value, the gate voltage is interrupted due to the effect of the differential amplifier 20 and the analog comparator 25 shown in FIG. 2, which prevents wraparound power supply by the supply fault power supply from occurring. Note that in the first embodiment shown in FIGS. 1 and 2, although both the positive-side wiring and negative-side wiring is necessary for the first and second electric loads 107a and 108a, and 107b and 108b, when the power supply is interrupted and the operation stops, even if a supply fault abnormality of the positive-side wiring occurs, the load switching devices 230a and 240a, and 230b and 240b connected to the downstream position are opened, so will not be left abnormally powered.

In FIG. 2, when the control circuit 160a generates the energization instruction signal DR0, the leakage current interrupting device 24 is caused to close to form an input circuit of the differential amplifier 20. Accordingly, when power supply current flowing in the current detection resistor 127 and the first reverse connection protection device 120a from the drain terminal D to the source terminal S is equal to or more than a predetermined threshold current, the analog comparator 25 outputs the current determination signal DRf having a logic level "H", which causes the drive transistor 125 to close, causing the first reverse connection protection device 120a to be conductive. However, when the power supply current is excessively small, i.e., less than the predetermined threshold current, the drive transistor 125 becomes opened, causing the first reverse connection protection device 120a to be undriven, so the power supply current will flow in the parasitic diode 121a in stead of flowing in the first reverse connection protection device 120a. When even the excessively small power supply current flows in the parasitic diode 121a, the voltage across the first reverse connection protection device 120a increases, causing the logic level of the current determination signal DRf for the differential amplifier 20 to be "H". Then, when the first reverse connection protection device 120a is closed, the voltage across the first reverse connection protection device 120a decreases, causing the logic level of the current determination signal DRf for the differential amplifier 20 to be "L". Accordingly, when the power supply current becomes less than the predetermined threshold current, the first reverse connection protection device 120a is repeatedly opened and closed. However, when the potential of the source terminal S of the first reverse connection protection device 120a is equal to or more than that of the drain terminal D and then reverse current is about to flow, the first reverse connection protection device 120a will not be caused to close, but is kept opened.

The internal resistance between the drain terminal D and the source terminal S of the first and second reverse connection protection devices 120a and 120b when they are closed is, for example, 7 mΩ, while the resistance of the current detection resistor 127 is, for example, 10 mΩ. Then, if the threshold current for causing the first and second reverse connection protection devices 120a and 120b to close is, for example, 0.1 A and the amplification factor of the differential amplifier 20 is 100, the determination threshold voltage $\Delta V0$ is $\Delta V0=(7+10)\times 0.1\times 100=170$ mV. On the other hand, if the power supply current for each of the first and second electric loads 107a and 108a, and 107b and 108b is, for example, 5 A, and the power supply current flowing in one reverse connection protection device is 10 A corresponding to two electric loads, then for the series connection of the current detection resistor 127 and the first and second reverse connection protection devices 120a and 120b, the voltage drop is (7+10)×10=170 mA and the incurred loss is 0.17×10=1.7 W. In order to reduce the incurred loss, the resistance of the current detection resistor 127 may be as small as possible, and desirably, the current detection resistor 127 may not be connected. In this case, increasing the threshold current to, for example, 0.3 A or so can reduce the minimum input voltage of the differential amplifier 20, preventing a control error from occurring. If the forward direction voltage drop by the parasitic diodes 121a and 121b is 1.0 V, when a current of 0.3 A flows with the reverse connection protection device not closed, the loss occurring in the reverse connection protection device will be 0.3×1.0=0.3 W, which is adequately smaller than a power consumption during operation of 1.7 W.

When the DC power supply 101 is connected with wrong power supply polarity as depicted by a dotted line in FIG. 1, if the first and second reverse connection protection devices 120a and 120b are conductive in the direction from the source terminal S to the drain terminal D, a power supply short circuit accident will occur through the parasitic diodes 231a and 241a, and 231b and 241b in the load switching devices 230a and 240a, and 230b and 240b, the commutation diodes 238a and 248a, and 238b and 248b, and the parasitic diode 111a in the power supply switching device 110a. However, since the source potential of the first and second reverse connection protection devices 120a and 120b will not be equal to or more than the gate potential, they will never be conductive in the direction from the source terminal S to the drain terminal D, so no power supply short circuit will occur. Note that when a simple diode is used as a reverse connection protection device, the voltage drop of the diode in normal operation is large, causing excessive increase in temperature due to power loss, while, when a field-effect transistor is used, the power loss will be significantly reduced. In the above description, the comparison of the power supply current and the threshold current is performed by the analog comparator 25 in the gate control circuit 129. However, the comparison may also be performed by a digital comparison unit 806a implemented with the control circuits 160a and 160b as described later with reference to FIG. 8. Also, for the power supply switching device 110a and the first and second reverse connection protection devices 120a and 120b, an N-channel type field-effect transistor may also be used in place of the P-channel type one.

(3) Aspects and Features of First Embodiment

As seen from the above description, the power supply branching control apparatus 100 according to a first aspect of the first embodiment is a power supply branching control apparatus 100 for supplying power to electric loads, including: first and second reverse connection protection devices 120a and 120b connected in series to the respective upstream positions of first and second electric loads 107a and 108a, and 107b and 108b connected to and branched from, and powered by a shared power supply switching device 110a connected to the positive-side terminal of a DC power supply 101; load switching devices 230a and 240a, and 230b and 240b also connected in series to the first and second electric loads, respectively; and control circuits 160a and 160b for supplying power supply current to the first and second electric loads through the power supply switching device, the first and second reverse connection protection devices and the load switching devices. The first and second reverse connection protection devices include: a P- or N-channel type field-effect transistor that is connected in a polarity such that the power supply current flows in the forward direction of parasitic diodes 121a and 121b generated between the source terminal S and the drain terminal D of the field-effect transistor; and a gate control circuit 129 for controlling the conduction between the source terminal S and the drain terminal D. The gate control circuit or the control circuit includes an analog comparator 25 or digital comparison unit 806a. When the power supply current flowing in the field-effect transistor in which the parasitic diode is generated is equal to or more than a predetermined threshold current, the analog comparator 25 or digital comparison unit 806a controls gate voltage applied between the source terminal S and the drain terminal D so as to cause the field-effect transistor to close. On the other hand, when the power supply current is less than the predetermined threshold current or at least when the voltage between the source terminal S and the drain terminal D is in a polarity in the reverse direction of the parasitic diode, the analog comparator 25 or digital comparison unit 806a causes the gate voltage to be interrupted and the field-effect transistor to be not conductive.

According to a second aspect of the first embodiment, in response to a current detection voltage Vdif proportional to the voltage across the first and second reverse connection protection devices 120a and 120b or the voltage across the series connection of the reverse connection protection device and a current detection resistor 127, when the current detection voltage Vdif is equal to or more than a determination threshold voltage ΔV0 corresponding to the predetermined threshold current, the gate control circuit 129 causes the first and second reverse connection protection devices to close, and when the current detection voltage Vdif is less than the determination threshold voltage ΔV0, the gate control circuit 129 causes the gate voltage for the first and second reverse connection protection devices to be interrupted so that, at least when the current detection voltage Vdif is in the direction opposite to the forward direction of the parasitic diode 121a and 121b, the first and second reverse connection protection devices will not be conductive. As above, according to the second aspect, the current detection voltage proportional to the power supply current flowing in the reverse connection protection device is compared to the determination threshold voltage proportional to the predetermined threshold current, and when the power supply current is less than the predetermined value, the reverse connection protection device is opened. Thus, one feature is that, even with the resistance of the current detection resistor reduced or eliminated, signal voltage proportional to the power supply current can be obtained due to the internal resistance of the reverse connection protection device, which can reduce the temperature increase in normal operation. If the power supply current flowing in the reverse connection protection device is a very small current close to the predetermined threshold current, when the reverse connection protection device is opened, current flows in the parasitic diode to increase the current detection voltage, and as a result, when the reverse connection protection device is closed, the current detection voltage decreases, so the reverse connection protection device is repeatedly opened and closed. However, since the power supply current is small, the temperature increase of the reverse connection protection device due to the repeated opening and closing operation can be limited to below the temperature increase due to continuous current in normal operation.

According to a third aspect of the first embodiment, the gate control circuit 129 includes a drive transistor 125 for causing the first and second reverse connection protection devices 120a and 120b to open or close in response to the current determination signal DRf from the analog comparator 25, and a differential amplifier 20 for generating the current detection voltage Vdif; the input terminals of the differential amplifier 20 are connected to each other via a pair of clip diodes 21; each of the input terminals are connected via input resistors 22a and 23a across the voltage to be measured for measuring the current detection voltage Vdif; a leakage current interrupting device 24 is connected in series to the input resistor 22a on the positive-input side; the leakage current interrupting device 24 is caused to open or close in response to an energization instruction signal DR0 generated by the control circuits 160a and 160b; and when at least the control circuit generates switching instruction signals DR1 and DR2 for the load switching devices 230a and 240a, and 230b and 240b, and the first and second electric loads 107a and 108a, and 107b and 108b are powered, the energization instruction signal DR0 causes the leakage current interrupting device 24 to close. As above, according to the third aspect, the input circuit of the differential amplifier for generating the current detection voltage is protected with the input resistors and the clip diodes so as not to be applied with overvoltage, and when the reverse connection protection device may be opened, the input circuit is interrupted by the leakage current interrupting device. Thus, one feature is that when a supply fault abnormality has occurred and the power switch is left open, the discharge of the DC power supply is reduced.

Second Embodiment (1) Detailed Description of Configuration

Figure 3:
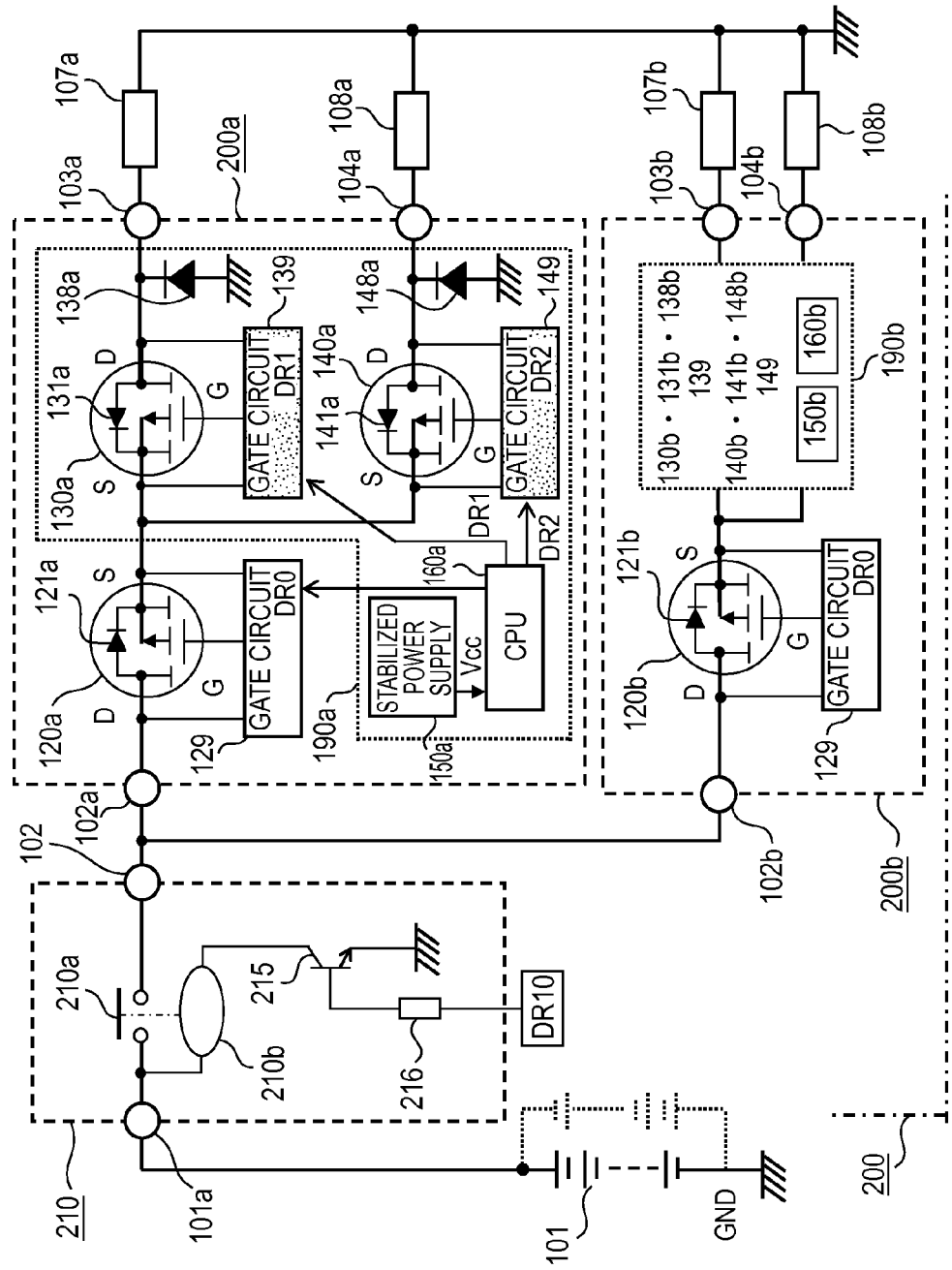
FIG. 3 is an overall circuit diagram of a power supply branching control apparatus for supplying power to electric loads in accordance with a second embodiment of the invention.
Figure 4:
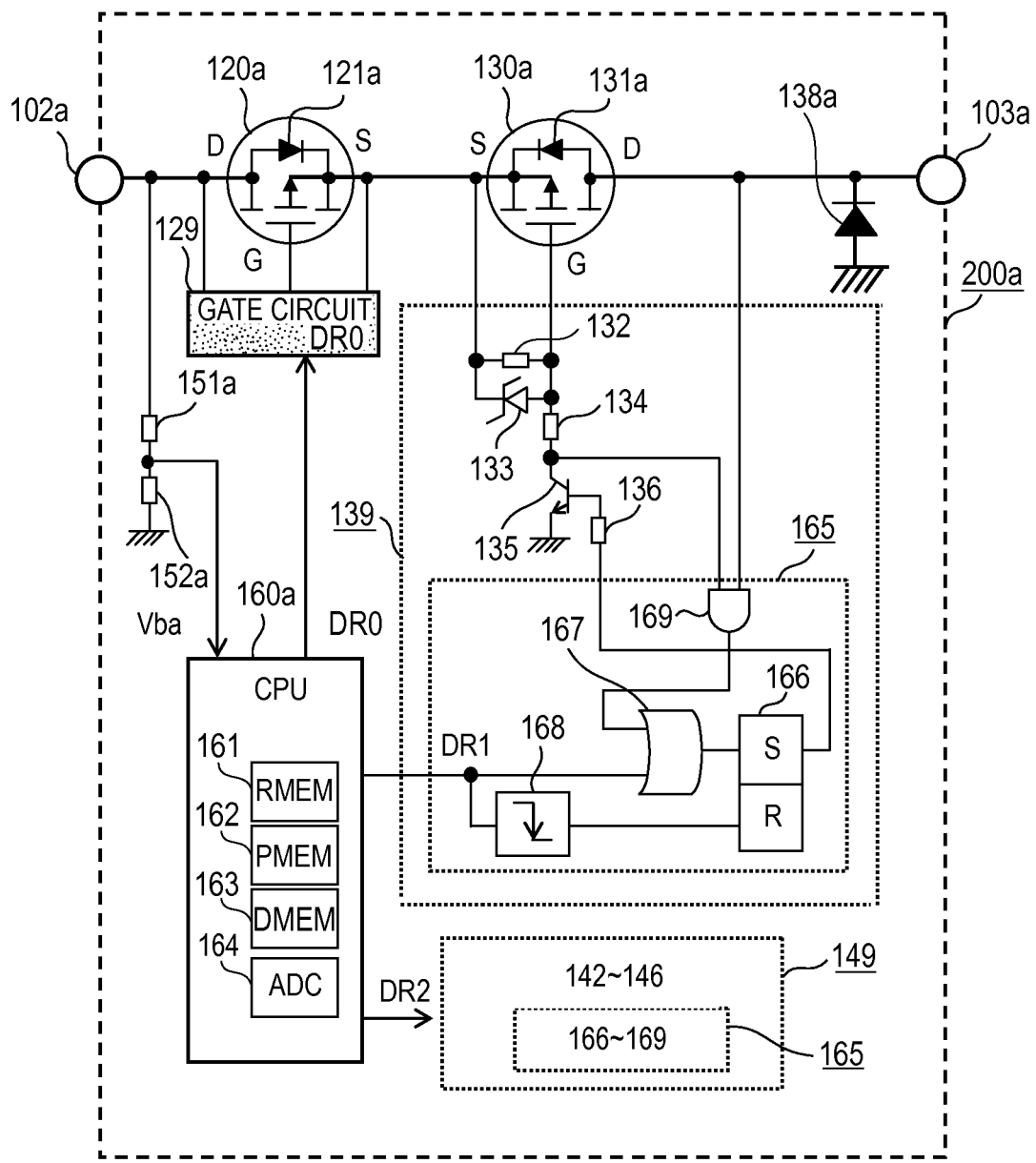
FIG. 4 is a detailed control circuit diagram of a portion of FIG. 3.

The configuration of a power supply branching control apparatus for supplying power to electric loads in accordance with a second embodiment of the invention is described in detail with reference to FIGS. 3 and 4, mainly on the difference from the apparatus shown in FIG. 1. FIG. 3 is an overall circuit diagram of the apparatus. FIG. 4 is a detailed control circuit diagram of a switching gate control circuit 139 in FIG. 3. The first of the main differences between FIGS. 1 and 3 is that, in the power supply/distribution controller 110aa in FIG. 1, a P-channel type field-effect transistor is used as a power supply switching device 110a, while, in a power supply/distribution controller 210 in FIG. 3, an output contact of a magnetic relay is used as a power supply switching device 210a. Furthermore, the second of the main differences is that the load switching devices in FIG. 1 is an N-channel type field-effect transistor connected to the downstream position of the first and second electric loads, while load switching devices in FIG. 3 is a P-channel type field-effect transistor connected to the upstream position of the first and second electric loads. However, for the first and second reverse connection protection devices 120a and 120b and the gate control circuit 129, the same components are used between FIGS. 1 and 3, so FIG. 2 as it is applied to the second embodiment.

In FIG. 3, a power supply branching control apparatus 200 includes: a power supply/distribution controller 210, powered by a DC power supply 101 that is, for example, an in-vehicle battery, for performing divided power distribution for a plurality of electric loads; and first and second power supply branching controllers 200a and 200b. The first power supply branching controller 200a supplies power to first electric loads 107a and 108a including a plurality of electric loads 107a and 108a. The second power supply branching controller 200b supplies power to second electric loads 107b and 108b including a plurality of electric loads 107b and 108b. The power supply/distribution controller 210 includes: a main power supply terminal 101a connected to the positive-pole terminal of the DC power supply 101; and a power supply switching device 210a, which is, for example, an output contact of a magnetic relay, connected between the main power supply terminal and a power distribution terminal 102. When a power supply instruction signal DR10 generated by a power supply/distribution control circuit not shown has a logic level "H" due to, for example, a power switch not shown being closed, the signal DR10 causes, through a base resistor 216, a power supply support transistor 215 to be conductive, then as a result, an excitation coil 210b is biased to cause an output contact 210a to close. In the power supply/distribution controller 210, a plurality of power supply switching devices not shown are provided and supply power to other electric loads through a plurality of power distribution terminals 102, and fuses not shown are appropriately connected in series to the power distribution lines.

The first power supply branching controller 200a includes: a first branch terminal 102a connected to the power distribution terminal 102 of the power supply/distribution controller 210; and a reverse connection protection device 120a, which is, for example, a P-channel type field-effect transistor, connected between the first branch terminal 102a and first load terminals 103a and 104a. In the reverse connection protection device 120a, a parasitic diode 121a is connected in the polarity direction the same as the direction in which power supply current for the first electric loads 107a and 108a flows, and when gate voltage is applied between the source terminal S and the gate terminal G by the gate control circuit 129 described previously, conduction is provided between the drain terminal D and the source terminal S in the same direction as the forward direction of the parasitic diode 121a, causing power supply current to flow in the plurality of first electric loads 107a and 108a. Load switching devices 130a and 140a are connected between first load terminals 103a and 104a connected to the positive-side terminals of the plurality of the first electric loads 107a and 108a and the source terminal S of the first reverse connection protection device 120a, respectively. Note that the load switching devices 130a and 140a are, for example, P-channel type field-effect transistors, and between the drain terminal D and the source terminal S of the transistors, parasitic diodes 131a and 141a are generated in the polarity such that power supply currents for the first electric loads 107a and 108a do not flow in the parasitic diodes 131a and 141a.

The stabilized power supply 150a provided in the first power supply branching controller 200a is powered through, for example, the first branch terminal 102a to generate a control voltage Vcc that is a predetermined stabilized voltage and supply power to a control circuit 160a provided in the first power supply branching controller 200a. The control circuit 160a applied with the control voltage Vcc generates switching instruction signals DR1 and DR2 in response to the operating state of input signals not shown to apply gate voltage between the gate terminal G and the source terminal S of the load switching devices 130a and 140a through switching gate control circuits 139 and 149 so that conduction will be provided between the source terminal S and the drain terminal D of the load switching devices 130a and 140a. Note that, when the first electric loads 107a and 108a are inductive loads, commutation diodes 138a and 148a are connected in parallel to the first electric loads 107a and 108a so that power supply current flowing due to the load switching devices 130a and 140a being closed will be commutated to the commutation diodes 138a and 148a and attenuated when the load switching devices 130a and 140a are opened. However, if the power supply current needs to be rapidly attenuated when the load switching devices 130a and 140a are opened, the commutation diodes 138a and 148a are not provided and high voltage will be generated across the load switching devices 130a and 140a based on the voltage limitation function of the parasitic diodes 131a and 141a. The stabilized power supply 150a, the control circuit 160a and the load switching devices 130a and 140a are collectively referred to as a load drive control circuit 190a.

The second power supply branching controller 200b, which is connected to the DC power supply 101 through the power supply switching device 210a, the power distribution terminal 102 and a second branch terminal 102b and supplies power to the second electric loads 107b and 108b, is similarly configured, i.e., includes: a load drive control circuit 190b as which a control circuit 160b that operates on a control voltage Vcc supplied by a stabilized power supply 150b and load switching devices 130b and 140b are collectively referred to; a second reverse connection protection device 120b including a parasitic diode 121b; and a gate control circuit 129 described previously with reference to FIG. 2. Note that the first power supply branching controller 200a and the second power supply branching controller 200b may be integrated, in which the stabilized power supplies 150a and 150b may also be integrated, and the control circuits 160a and 160b may also be integrated. Also, the power supply switching device 210a in the power supply/distribution controller 210 may also be provided within the first and second power supply branching controllers that are integrated. In this case, the integrated power supply branching controller will take a configuration in which the plurality of reverse connection protection devices 120a, 120b and so on are connected to and branched from the shared power supply switching device 210a, instead of taking a configuration in which a separate power supply switching device is provided for each of a plurality of reverse connection protection devices.

Next, referring to FIG. 4, the switching gate control circuit 139 applied to the load switching devices 130a and 130b in the first and second power supply branching controllers 200a and 200b is described in detail. Note that the switching gate control circuit 149 applied to the load switching devices 140a and 140b is configured similarly to the switching gate control circuit 139. In the switching gate control circuit 139 in FIG. 4, a gate resistor 132 and a voltage regulator diode 133, connected in parallel to each other, are connected between the source terminal S and the gate terminal G of the load switching device 130a, and the gate terminal G is connected to the ground circuit GND through a drive resistor 134 and a switching support transistor 135 that is an NPN type transistor. When the SET output of a flip-flop circuit 166 described later has a logic level "H", the switching support transistor 135 is caused, through a base resistor 136, to be conductive, then as a result, the voltage divided by the gate resistor 132 and the drive resistor 134 is limited by the voltage regulator diode 133 and applied as gate voltage between the source terminal S and the gate terminal G of the load switching device 130a.

As previously described with reference to FIG. 2, the control circuit 160a includes a microprocessor that works with: a RAM memory 161 for processing; a nonvolatile program memory 162 that is, for example, a flash memory; a nonvolatile data memory 163 that is a portion of the nonvolatile program memory or divided from and connected to the nonvolatile program memory; and a multi-channel A/D converter 164. The power supply voltage of the DC power supply 101 applied to the first branch terminal 102a through the power supply switching device 210a is divided by voltage division resistors 151a and 152a to be input to the multi-channel A/D converter 164 as a measured power supply voltage Vba and to generate an energization instruction signal DR0 for the gate control circuit 129 connected to the first reverse connection protection device 120a. A switching signal processing circuit 165 provided in the switching gate control circuit 139 includes the flip-flop circuit 166. An OR gate 167 is connected to the SET input circuit of the flip-flop circuit 166. A fall differentiating circuit 168 for a switching instruction signal DR1 generated by the control circuit 160a is connected to the RESET input circuit of the flip-flop circuit 166. The SET output of the flip-flop circuit 166 causes, through the base resistor 136, the switching support transistor 135 to close.

An AND gate 169 outputs a signal having a logic level "H" when both of its first and second inputs have a logic level "H". The first input takes a logic level "H" when the switching support transistor 135 is opened. The second input has a logic level "H" when the positive-side wire of the first electric loads 107a connected to the first load terminal 103a is in fault contact with the power supply line or when the load switching device 130a is closed. Note that since, if the first input has a logic level "H", the load switching device 130a is opened, normally, the second input and the AND output of the AND gate 169 should have a logic level "L", but, if a supply fault accident has occurred in the first electric load 107a, both the first and second inputs have a logic level "H", so the output also has a logic level "H". When at least one of the switching instruction signal DR1 generated by the control circuit 160a and the logic output of the AND gate 169 has a logic level "H", the OR gate 167 causes the flip-flop circuit 166 to be set.

The switching gate control circuit 149 for the load switching device 140a that drives the other first electric load 108a in response to the switching instruction signal DR2 generated by the control circuit 160a is similarly configured, i.e., includes a gate resistor 142, a voltage regulator diode 143, a drive resistor 144, a switching support transistor 145, a base resistor 146 and a switching signal processing circuit 165. The switching signal processing circuit 165 includes the flip-flop circuit 166, the OR gate 167, the fall differentiating circuit 168 and the AND gate 169.

(2) Detailed Description of Effect and Operation

Next, the effect and operation of the power supply branching control apparatus according to the second embodiment configured as shown in FIGS. 3 and 4 is described in detail. First, in FIG. 3, for example, when a power switch not shown is closed to generate the power supply instruction signal DR10, the power supply switching device 210a is caused, through the power supply support transistor 215, to close, thereby providing the power supply voltage of the DC power supply 101 to the first and second branch terminals 102a and 102b provided in the first and second power supply branching controllers 200a and 200b. As a result, when the stabilized power supplies 150a and 150b in the first and second power supply branching controllers 200a and 200b generate the control voltage Vcc and the control circuits 160a and 160b generate the energization instruction signal DR0, the gate control circuits 129 for the first and second reverse connection protection devices 120a and 120b start operation as described previously with reference to FIG. 2. When the control circuits 160a and 160b generate the switching instruction signals DR1 and DR2 in response to the operating state of input signals not shown, thereby causing any of the load switching devices 130a and 140a, and 130b and 140b to close, any of the first and second electric loads 107a and 108a, and 107b and 108b connected to the closed load switching device will be powered and driven.

Note that, when a positive-line ground fault abnormality occurs in which the positive-side wire of any of the first and second electric loads 107a and 108a, and 107b and 108b is in fault contact with the ground circuit GND, overcurrent flows in the power supply switching device 210a, corresponding one of the first and second reverse connection protection devices 120a and 120b and the load switching devices 130a and 140a, and 130b and 140b, but, if the load switching devices 130a and 140a, and 130b and 140b have an overcurrent interrupting function, the circuit devices and wires can be prevented from being burnt. This also applies to when an internal short circuit occurs in any of the first and second electric loads 107a and 108a, and 107b and 108b.

On the other hand, when a positive-line supply fault abnormality occurs in which the positive-side wire of any of the first and second electric loads 107a and 108a, and 107b and 108b is in fault contact with the power supply line of the DC power supply 101, for example, when the positive-side wire of the first electric load 107a is in fault contact with the positive-pole wire of the DC power supply 101 and the power supply switching device 210a is opened, if the first reverse connection protection device 120a is conductive in the direction from the source terminal S to the drain terminal D, the supply fault power supply may wraparound toward the second reverse connection protection device 120b, which may enable the second electric loads 107b and 108b to be powered. However, in the first reverse connection protection device 120a, when current flowing from the drain terminal D to the source terminal S becomes equal to or less than a predetermined value, the gate voltage is interrupted due to the effect of the differential amplifier 20 and the analog comparator 25 shown in FIG. 2, which prevents wraparound power supply by the supply fault power supply from occurring. Note that, in the second embodiment shown in FIGS. 3 and 4, it is advantageous that the wiring of the first and second electric loads 107a and 108a, and 107b and 108b is needed only on the positive side, but, when a positive-side line supply fault abnormality occurs, even with the power supply interrupted to stop operation, power supply current to an electric load in supply fault accident cannot be interrupted, so an abnormality notification unit not shown is added.

In FIG. 4, when the switching instruction signal DR1 generated by the control circuit 160a changes from a logic level "H" to a logic level "L", the fall differentiating circuit 168 causes the flip-flop circuit 166 to be reset, thereby causing the switching support transistor 135 and the load switching device 130a to open. In normal operation with no supply fault accident, the AND gate 169 outputs a logic level "L", which keeps the flip-flop circuit 166 reset. When the switching instruction signal DR1 changes from a logic level "L" to a logic level "H", the OR gate 167 causes the flip-flop circuit 166 to be set, thereby causing the switching support transistor 135 and the load switching device 130a to close. However, even when the switching instruction signal DR1 changes from a logic level "H" to a logic level "L" and the fall differentiating circuit 168 causes the flip-flop circuit 166 to be reset, thereby causing the switching support transistor 135 and the load switching device 130a to open, if a supply fault accident has occurred, the AND gate 169 outputs a logic level "H", immediately causing the flip-flop circuit 166 to be set again, which causes the switching support transistor 135 and the load switching device 130a to close without waiting for the switching instruction signal DR1 changing from a logic level "L" to a logic level "H".

This prevents the parasitic diode 131a from being burnt by overheat due to wraparound power supply from the supply fault power supply to the first electric load 108a through the parasitic diode 131a. Specifically, since the load switching device 130a is forced to close despite the switching instruction signal DR1 is an instruction to open, conduction is provided between the drain terminal D and the source terminal S of the load switching device 130a without relying on the wraparound power supply through the parasitic diode 131a, preventing the parasitic diode 131a from being burnt by overheat. However, when the load switching device 140a is opened, no wraparound power supply occurs and a supply fault accident with operation stopped has no impact on another electric load. In the above description, the comparison of the power supply current and the threshold current is performed by the analog comparator 25 in the gate control circuit 129. However, the comparison may also be performed by a digital comparison unit 806a implemented with the control circuits 160a and 160b as described later with reference to FIG. 8. Furthermore, for the power supply switching device 210a, a P- or N-channel type field-effect transistor may be used. Also, for the first and second reverse connection protection devices 120a and 120b and the load switching devices 130a and 140a, and 130b and 140b, an N-channel type field-effect transistor may also be used in place of the P-channel type one.

(3) Aspects and Features of Second Embodiment

As seen from the above description, the power supply branching control apparatus 200 according to a first aspect of the second embodiment is a power supply branching control apparatus 200 for supplying power to electric loads, including: first and second reverse connection protection devices 120a and 120b connected in series to the respective upstream positions of first and second electric loads 107a and 108a, and 107b and 108b connected to and branched from, and powered by a shared power supply switching device 210a connected to the positive-side terminal of a DC power supply 101; load switching devices 130a and 140a, and 130b and 140b also connected in series to the first and second electric loads, respectively; and control circuits 160a and 160b for supplying power supply current to the first and second electric loads through the power supply switching device, the first and second reverse connection protection devices and the load switching devices. The first and second reverse connection protection devices include: a P- or N-channel type field-effect transistor that is connected in a polarity such that the power supply current flows in the forward direction of parasitic diodes 121a and 121b generated between the source terminal S and the drain terminal D of the field-effect transistor; and a gate control circuit 129 for controlling the conduction between the source terminal S and the drain terminal D. The gate control circuit or the control circuit includes an analog comparator 25 or digital comparison unit 806a. When the power supply current flowing in the field-effect transistor in which the parasitic diode is generated is equal to or more than a predetermined threshold current, the analog comparator 25 or digital comparison unit 806a controls gate voltage applied between the source terminal S and the gate terminal G so as to cause the field-effect transistor to close. On the other hand, when the power supply current is less than the predetermined threshold current or at least when the voltage between the source terminal S and the drain terminal D is in a polarity in the reverse direction of the parasitic diode, the analog comparator 25 or digital comparison unit 806a causes the gate voltage to be interrupted and the field-effect transistor to be not conductive.

According to a second aspect of the second embodiment, in response to a current detection voltage Vdif proportional to the voltage across the first and second reverse connection protection devices 120a and 120b or the voltage across the series connection of the reverse connection protection device and a current detection resistor 127, when the current detection voltage Vdif is equal to or more than a determination threshold voltage ΔV0 corresponding to the predetermined threshold current, the gate control circuit 129 causes the first and second reverse connection protection devices to close, and when the current detection voltage Vdif is less than the determination threshold voltage ΔV0, the gate control circuit 129 causes the gate voltage for the first and second reverse connection protection devices to be interrupted so that, at least when the current detection voltage Vdif is in the direction opposite to the forward direction of the parasitic diode 121a and 121b, the first and second reverse connection protection devices will not be conductive. As above, according to the second aspect, the current detection voltage proportional to the power supply current flowing in the reverse connection protection device is compared to the determination threshold voltage proportional to the predetermined threshold current, and when the power supply current is less than the predetermined value, the reverse connection protection device is opened. Thus a feature similar to that of the first embodiment is given.

According to a third aspect of the second embodiment, the gate control circuit 129 includes a drive transistor 125 for causing the first and second reverse connection protection devices 120a and 120b to open or close in response to the current determination signal DRf from the analog comparator 25, and a differential amplifier 20 for generating the current detection voltage Vdif; the input terminals of the differential amplifier 20 are connected to each other via a pair of clip diodes 21; each of the input terminals are connected via input resistors 22a and 23a across the voltage to be measured for measuring the current detection voltage Vdif; a leakage current interrupting device 24 is connected in series to the input resistor 22a on the positive-input side; the leakage current interrupting device 24 is caused to open or close in response to an energization instruction signal DR0 generated by the control circuits 160a and 160b; and when at least the control circuit generates switching instruction signals DR1 and DR2 for the load switching devices 130a and 140a, and 130b and 140b, and the first and second electric loads 107a and 108a, and 107b and 108b are powered, the energization instruction signal DR0 causes the leakage current interrupting device 24 to close. As above, according to the third aspect, the input circuit of the differential amplifier for generating the current detection voltage is protected with the input resistors and the clip diodes so as not to be applied with overvoltage, and when the reverse connection protection device may be opened, the input circuit is interrupted by the leakage current interrupting device. Thus a feature similar to that of the first embodiment is given.

According to a fourth aspect of the second embodiment, any one or both of the first and second electric loads include a plurality of electric loads 107a and 108a, and 107b and 108b powered and driven through any of a plurality of load switching devices 130a and 140a, and 130b and 140b connected in series to and branched from the downstream positions of the first and second reverse connection protection devices 120a and 120b; the plurality of load switching devices include a P- or N-channel type field-effect transistor that is connected in a polarity such that the power supply current flows in the direction opposite to the forward direction of parasitic diodes 131a and 141a, and 131b and 141b generated between the source terminal S and the drain terminal D of the field-effect transistor, and switching gate control circuits 139 and 149 for controlling the conduction between the source terminal S and the drain terminal D in response to the switching instruction signals DR1 and DR2 provided to the plurality of load switching devices, respectively; and the switching gate control circuits include a switching signal processing circuit 165 that monitors the output voltage of the plurality of load switching devices whenever the switching instruction signals DR1 and DR2 become an instruction to open, and when an output voltage is generated with any of the load switching devices opened, determines that an indirect supply fault abnormality has occurred in which the output wire of the load switching device in question is in fault contact with the positive-pole wire of the DC power supply 101, then, when the occurrence of the indirect supply fault abnormality is detected, forcibly causes the load switching device in question to close until the switching instruction signals DR1 and DR2 become an instruction to open again.

As above, according to the fourth aspect, whenever the load switching devices are caused to open, it is determined whether or not an indirect supply fault has occurred in the output wire of any of the load switching devices, and if the indirect supply fault is detected, the load switching device in question is forcibly caused to close until a next instruction to open is generated. Thus, one feature is that avoiding a wraparound power supply to another electric load through an internal parasitic diode of the load switching device in which an indirect supply fault abnormality has occurred and providing reverse conduction between the drain terminal D and the source terminal S of the forcibly closed load switching device enables significant reduction in temperature increase of the load switching device in question.

Third Embodiment (1) Detailed Description of Configuration

Figure 5:
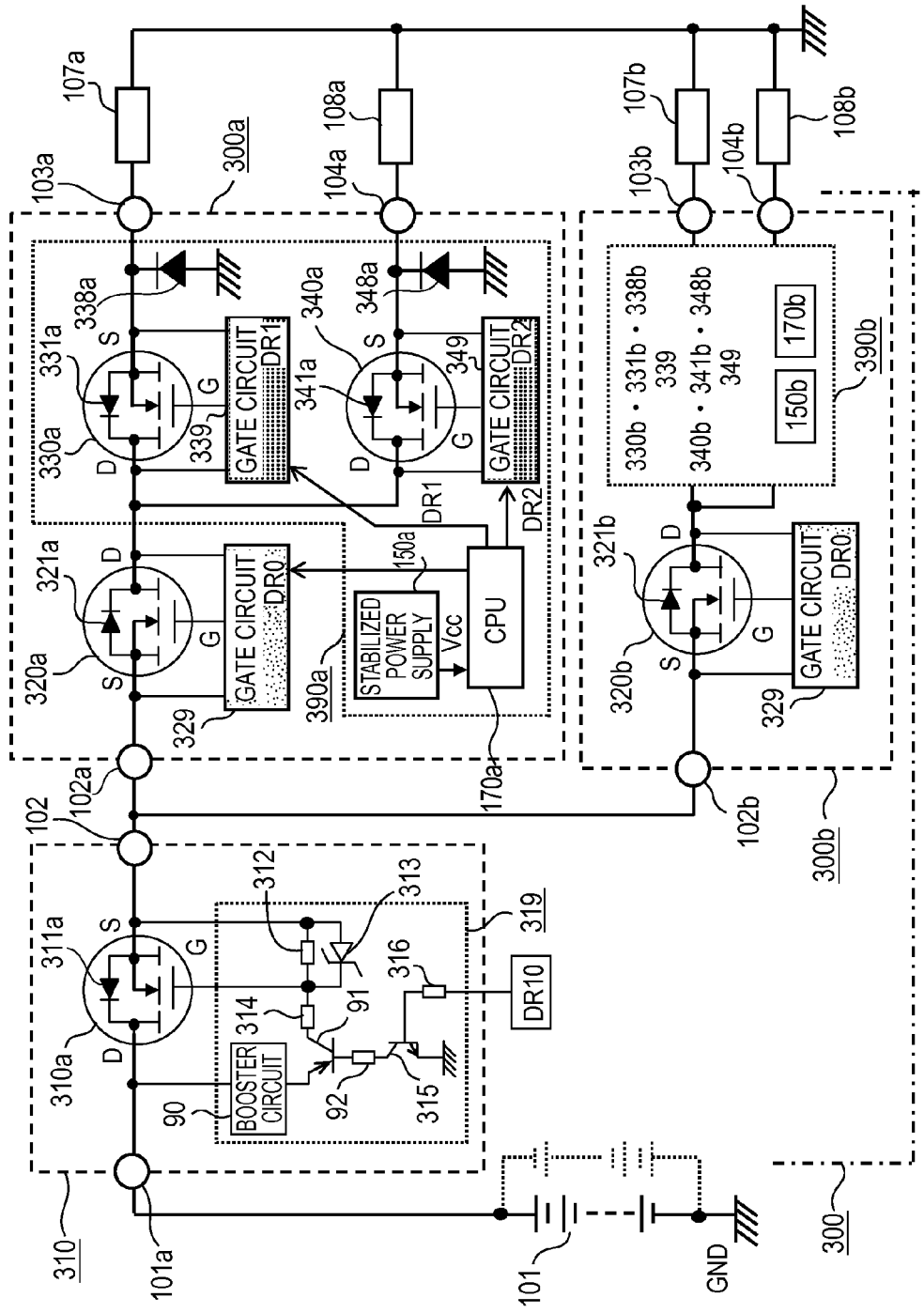
FIG. 5 is an overall circuit diagram of a power supply branching control apparatus for supplying power to electric loads in accordance with a third embodiment of the invention.
Figure 6:
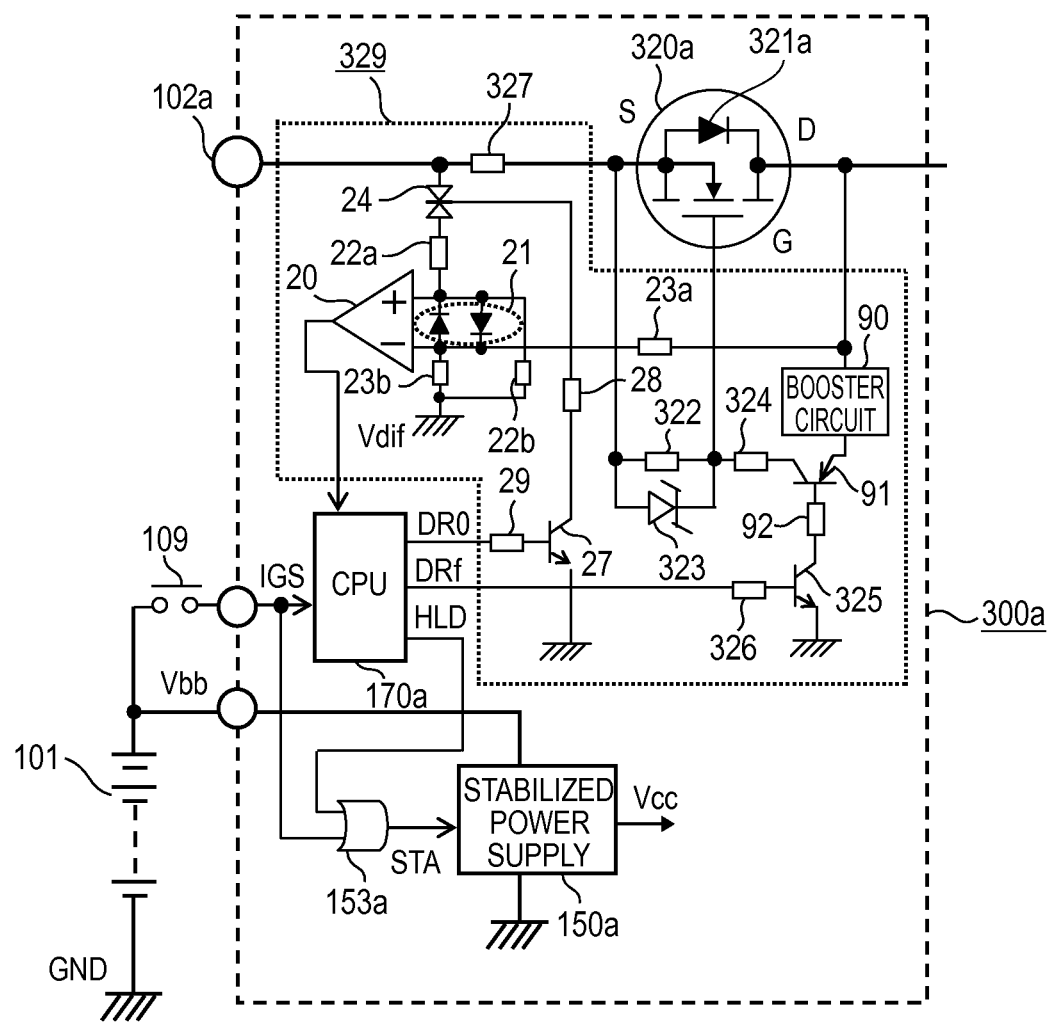
FIG. 6 is a detailed control circuit diagram of a portion of FIG. 5.
Figure 7:
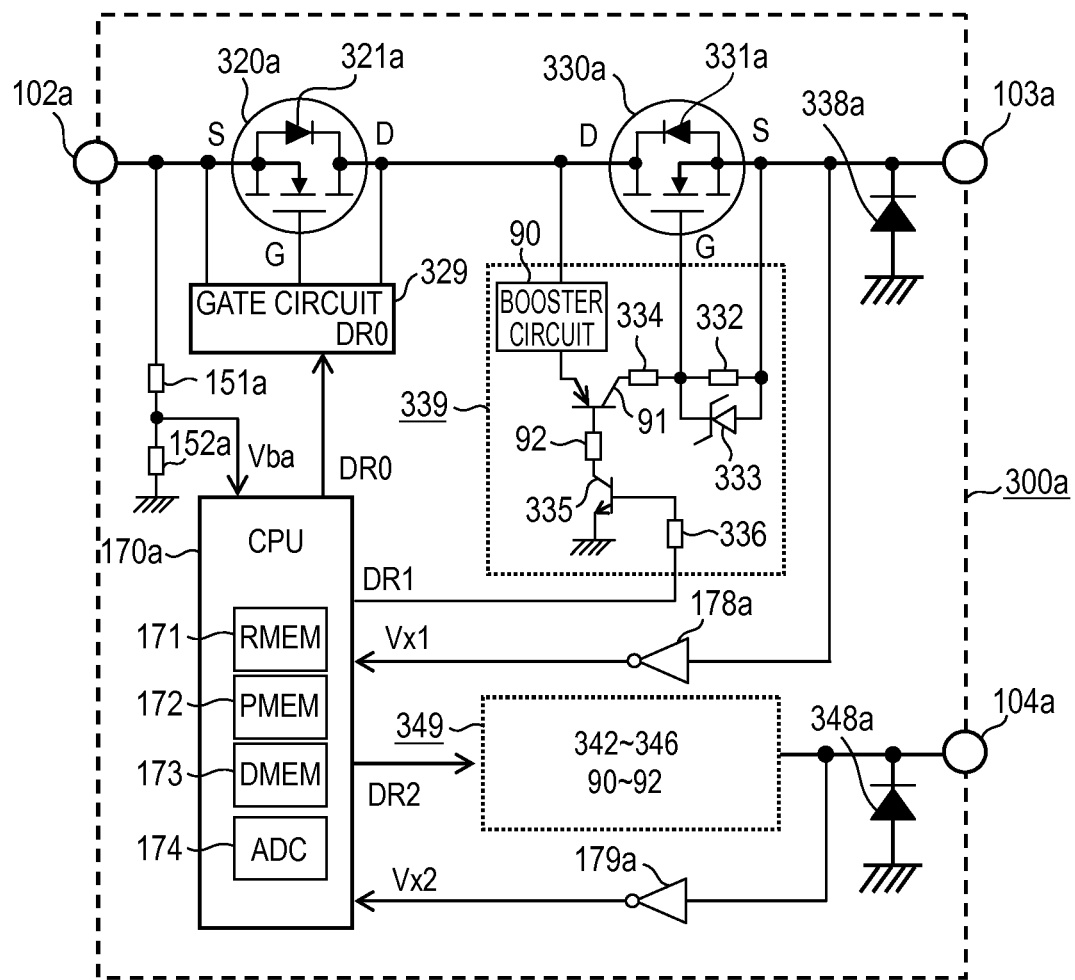
FIG. 7 is a detailed control circuit diagram of another example of the portion of FIG. 5.

The configuration of a power supply branching control apparatus for supplying power to electric loads in accordance with a third embodiment of the invention is described in detail with reference to FIGS. 5 to 7. FIG. 5 is an overall circuit diagram of the apparatus. FIGS. 6 and 7 is a detailed control circuit diagram of a gate control circuit 329 and switching gate control circuits 339 and 349. The first of the main differences from FIGS. 1 and 3 is that, in the power supply/distribution controller 110aa in FIG. 1, a P-channel type field-effect transistor is used as a power supply switching device 110a, while, in a power supply/distribution controller 310 in FIG. 5, an N-channel type field-effect transistor is used as a power supply switching device 310a. Furthermore, the second of the main differences is that, in FIG. 1, a P-channel type field-effect transistor is used for the first and second reverse connection protection devices 120a and 120b, while, in FIG. 5, an N-channel type field-effect transistor is used for first and second reverse connection protection devices 320a and 320b. Furthermore, the third of the main differences is that the load switching devices in FIG. 1 are an N-channel type field-effect transistor connected to the downstream position of the first and second electric loads, while load switching devices in FIG. 5 are a N-channel type field-effect transistor connected to the upstream position of first and second electric loads. Note that, in order to use an N-channel type field-effect transistor at the upstream position of an electric load, a booster circuit using a known charge pump circuit is generally used.

First, in FIG. 5, a power supply branching control apparatus 300 includes: a power supply/distribution controller 310, powered by a DC power supply 101 that is, for example, an in-vehicle battery, for performing divided power distribution for a plurality of electric loads; and first and second power supply branching controllers 300a and 300b. The first power supply branching controller 300a supplies power to first electric loads 107a and 108a including a plurality of electric loads 107a and 108a. The second power supply branching controller 300b supplies power to second electric loads 107b and 108b including a plurality of electric loads 107b and 108b. The power supply/distribution controller 310 includes: a main power supply terminal 101a connected to the positive-pole terminal of the DC power supply 101; and a power supply switching device 310a, which is, for example, an N-channel type field-effect transistor, connected between the main power supply terminal and a power distribution terminal 102. In the power supply switching device 310a, a parasitic diode 311a is connected in the polarity direction for interrupting discharge from the DC power supply 101, and when gate voltage is applied between the gate terminal G and the source terminal S by a power supply gate control circuit 319 described later, conduction is provided between the drain terminal D and the source terminal S in the direction opposite to the forward direction of the parasitic diode 311a, causing power supply current to flow in the first and second electric loads 107a and 108a, and 107b and 108b.

In the power supply/distribution controller 310, a plurality of power supply switching devices not shown are provided and supply power to other electric loads through a plurality of power distribution terminals 102, and fuses not shown are appropriately connected in series to the power distribution lines. In the power supply gate control circuit 319, a gate resistor 312 and a voltage regulator diode 313, connected in parallel to each other, are connected between the gate terminal G and the source terminal S of the power supply switching device 310a, and the gate terminal G is connected to the output terminal of a booster circuit 90 through a drive resistor 314 and a PNP-type relay transistor 91. The booster circuit 90 is connected to the drain terminal D of the power supply switching device 310a and generates added voltage boosted with respect to the power supply voltage of the DC power supply 101. The base terminal of the relay transistor 91 is connected to a ground circuit GND through a base resistor 92 and a power supply support transistor 315. When a power supply instruction signal DR10 generated by a power supply/distribution control circuit not shown has a logic level "H" due to, for example, a power switch not shown being closed, the signal DR10 causes, through a base resistor 316, the power supply support transistor 315 to be conductive, then as a result, the boosted voltage divided by the gate resistor 312 and the drive resistor 314 is limited by the voltage regulator diode 313 and applied as gate voltage between the gate terminal G and the source terminal S of the power supply switching device 310a.

The first power supply branching controller 300a includes: a first branch terminal 102a connected to the power distribution terminal 102 of the power supply/distribution controller 310; and a reverse connection protection device 320a, which is, for example, an N-channel type field-effect transistor, connected between the first branch terminal 102a and first load terminals 103a and 104a. In the reverse connection protection device 320a, a parasitic diode 321a is connected in the polarity direction the same as the direction in which power supply current for the first electric loads 107a and 108a flows, and when gate voltage is applied between the gate terminal G and the source terminal S by a gate control circuit 329 described later, conduction is provided between the source terminal S and the drain terminal D in the same direction as the forward direction of the parasitic diode 321a, causing power supply current to flow in the plurality of first electric loads 107a and 108a. Load switching devices 330a and 340a are connected between first load terminals 103a and 104a connected to the positive-side terminals of the plurality of the first electric loads 107a and 108a and the drain terminal D of the first reverse connection protection device 320a, respectively. Note that the load switching devices 330a and 340a are, for example, N-channel type field-effect transistors, and between the drain terminal D and the source terminal S of the transistors, parasitic diodes 331a and 341a are generated in the polarity such that power supply currents for the first electric loads 107a and 108a do not flow in the parasitic diodes 331a and 341a.

A stabilized power supply 150a provided in the first power supply branching controller 300a is powered through the DC power supply 101, as described later with reference to FIG. 6, to generate a control voltage Vcc that is a predetermined stabilized voltage and supply power to a control circuit 170a provided in the first power supply branching controller 300a. The control circuit 170a applied with the control voltage Vcc generates switching instruction signals DR1 and DR2 in response to the operating state of input signals not shown to apply gate voltage between the gate terminal G and the source terminal S of the load switching devices 330a and 340a through switching gate control circuits 339 and 349 so that conduction will be provided between the drain terminal D and the source terminal S of the load switching devices 330a and 340a. Note that, when the first electric loads 107a and 108a are inductive loads, commutation diodes 338a and 348a are connected in parallel to the first electric loads 107a and 108a so that power supply current flowing due to the load switching devices 330a and 340a being closed will be commutated to the commutation diodes 338a and 348a and attenuated when the load switching devices 330a and 340a are opened. However, if the power supply current needs to be rapidly attenuated when the load switching devices 330a and 340a are opened, the commutation diodes 338a and 348a are not provided and high voltage will be generated across the load switching devices 330a and 340a based on the voltage limitation function of the parasitic diodes 331a and 341a. The stabilized power supply 150a, the control circuit 170a and the load switching devices 330a and 340a are collectively referred to as a load drive control circuit 390a.

The second power supply branching controller 300b, which is connected to the DC power supply 101 through the power supply switching device 310a, the power distribution terminal 102 and a second branch terminal 102b and supplies power to the second electric loads 107b and 108b, is similarly configured, i.e., includes: a load drive control circuit 390b as which a control circuit 170b that operates on a control voltage Vcc supplied by a stabilized power supply 150b and load switching devices 330b and 340b are collectively referred to; a second reverse connection protection device 320b including a parasitic diode 321b; and a gate control circuit 329 described later with reference to FIG. 6. Note that the first power supply branching controller 300a and the second power supply branching controller 300b may be integrated, in which the stabilized power supplies 150a and 150b may also be integrated, and the control circuits 170a and 170b may also be integrated. Also, the power supply switching device 310a in the power supply/distribution controller 310 may also be provided within the first and second power supply branching controllers that are integrated. In this case, the integrated power supply branching controller will take a configuration in which the plurality of reverse connection protection devices 320a, 320b and so on are connected to and branched from the shared power supply switching device 310a, instead of taking a configuration in which a separate power supply switching device is provided for each of a plurality of reverse connection protection devices.

Next, referring to FIG. 6, the gate control circuit 329 applied to the first reverse connection protection device 320a in the first power supply branching controller 300a is described in detail. Note that the gate control circuit 329 applied to the second reverse connection protection device 320b in the second power supply branching controller 300b is similar to the one shown in FIG. 6. In the gate control circuit 329 in FIG. 6, a gate resistor 322 and a voltage regulator diode 323, connected in parallel to each other, are connected between the source terminal S and the gate terminal G of the first reverse connection protection device 320a, and the gate terminal G is connected to the output terminal of the booster circuit 90 through a drive resistor 324 and a PNP type relay transistor 91. The booster circuit 90 is connected to the drain terminal D of the power supply switching device 310a and generates added voltage boosted with respect to the power supply voltage of the DC power supply 101. The base terminal of the relay transistor 91 is connected to the ground circuit GND through the base resistor 92 and a drive transistor 325. When the control circuit 170a generates a current determination signal DRf having a logic level "H", the drive transistor 325 is caused, through a base resistor 326, to be conductive, then as a result, the boosted voltage divided by the gate resistor 322 and the drive resistor 324 is limited by the voltage regulator diode 323 and applied as gate voltage between the gate terminal G and the source terminal S of the first reverse connection protection device 320a. A current detection resistor 327 is connected in series to the source terminal S or drain terminal D of the first reverse connection protection device 320a, and the voltage across the series connection of the first reverse connection protection device 320a and the current detection resistor 327 is amplified by a differential amplifier 20 that generates a current detection voltage Vdif proportional to current flowing in the first reverse connection protection device 320a.

The differential amplifier 20 has a pair of input terminals, the input voltage of which is limited by a pair of clip diodes 21 connected in parallel and opposite to each other between the input terminals, the positive input terminal being connected to an input resistor 22a connected to the upstream position of the current detection resistor 327 through a leakage current interrupting device 24, the negative input terminal being connected to an input resistor 23a connected to the drain terminal D (downstream position) of the first reverse connection protection device 320a. Also, pull-down resistors 22b and 23b are connected to the respective input terminals in order to define the potentials of the input terminals when the leakage current interrupting device 24 is opened. The current detection voltage Vdif generated by the differential amplifier 20 is input to the control circuit 170a and compared to a determination threshold voltage $\Delta V0$ that is a predetermined constant by a microprocessor described later. When Vdif $\geq \Delta V0$, the control circuit 170a outputs the current determination signal DRf having a logic level "H", causing, through the base resistor 326, the drive transistor 325 to close. As also shown in FIG. 7, the control circuit 170a includes a microprocessor that works with: a RAM memory 171 for processing; a nonvolatile program memory 172 that is, for example, a flash memory; a nonvolatile data memory 173 that is a portion of the nonvolatile program memory or divided from and connected to the nonvolatile program memory; and a multi-channel A/D converter 174. The leakage current interrupting device 24 is caused, through a drive resistor 28, to close when a support transistor 27 is closed. A base resistor 29 for driving the support transistor 27 is connected to an energization instruction signal DR0 generated by the control circuit 170a.

When a power switch 109 is closed to generate a power switch signal IGS having a logic level "H", the stabilized power supply 150a to which a main power supply voltage Vbb is applied by the DC power supply 101 is given a power supply start signal STA through an OR gate 153a to generate a control voltage Vcc that is a predetermined stabilized voltage of, for example, 5 VDC, which is supplied to the control circuit 170a. Note that the stabilized power supply 150a includes a constant voltage control circuit using, for example, a junction type transistor in which the base circuit is configured so that, when the DC power supply 101 is connected with wrong power supply polarity (reverse polarity), the junction type transistor is non-conductive, preventing the control voltage Vcc from being generated. On starting operation, the control circuit 170a generates a self hold instruction signal HLD. Then, the self hold instruction signal HLD and the power switch signal IGS are input to the AND gate 153a. Accordingly, once the power switch 109 is closed and the control circuit 170a starts operation, even when the power switch 109 is opened, the power supply start signal STA stays effective. When the control circuit 170a releases the self hold instruction signal HLD, the stabilized power supply 150a stops operation.

Next, referring to FIG. 7, the switching gate control circuit 339 applied to the load switching devices 330a and 330b in the first and second power supply branching controllers 300a and 300b is described in detail. Note that the switching gate control circuit 349 applied to the load switching devices 340a and 340b is configured similarly to the switching gate control circuit 339. In FIG. 7, in the switching gate control circuit 339, a gate resistor 332 and a voltage regulator diode 333, connected in parallel to each other, are connected between the gate terminal G and the source terminal S of the load switching device 330a, and the gate terminal G is connected to the output terminal of a booster circuit 90 through a drive resistor 334 and a PNP-type relay transistor 91. The booster circuit 90 is connected to the drain terminal D of the load switching device 330a and generates added voltage boosted with respect to the power supply voltage of the DC power supply 101. The base terminal of the relay transistor 91 is connected to the ground circuit GND through the base resistor 92 and a switching support transistor 335. When the control circuit 170a generates a switching instruction signal DR1 having a logic level "H", the switching support transistor 335 is caused, through a base resistor 336, to be conductive, then as a result, the boosted voltage divided by the gate resistor 332 and the drive resistor 334 is limited by the voltage regulator diode 333 and applied as gate voltage between the gate terminal G and the source terminal S of the load switching device 330a.

As previously described with reference to FIG. 6, the control circuit 170a includes a microprocessor that works with: a RAM memory 171 for processing; a nonvolatile program memory 172 that is, for example, a flash memory; a nonvolatile data memory 173 that is a portion of the nonvolatile program memory or divided from and connected to the nonvolatile program memory; and a multi-channel A/D converter 174. The power supply voltage of the DC power supply 101 applied to the first branch terminal 102a through the power supply switching device 310a is divided by voltage division resistors 151a and 152a to be input to the multi-channel A/D converter 174 as a measured power supply voltage Vba and to generate an energization instruction signal DR0 for the gate control circuit 329 connected to the first reverse connection protection device 320a. Furthermore, load voltage monitor devices 178a and 179a, a NOT gate, are connected to the source terminal S of the load switching devices 330a and 340a. The load voltage monitor devices 178a and 179a output load monitoring signal Vx1 and Vx2 which are input to the control circuit 170a. The switching gate control circuit 349 for the load switching device 340a that drives the other first electric load 108a in response to the switching instruction signal DR2 generated by the control circuit 170a is similarly configured, i.e., includes a gate resistor 342, a voltage regulator diode 343, a drive resistor 344, a switching support transistor 345, a base resistor 346, a booster circuit 90, a relay transistor 91 and a base resistor 92.

(2) Detailed Description of Effect and Operation

Next, the effect and operation of the power supply branching control apparatus according to the third embodiment configured as shown in FIGS. 5 to 7 is described in detail with reference to flowcharts for describing operation shown in FIGS. 8 and 9 and a list of abnormality determination items shown in FIG. 10. First, in FIG. 5, for example, when the power switch 109 (see FIG. 6) is closed to generate the power supply instruction signal DR10, the power supply switching device 310a is caused, through the power supply support transistor 315, to close, thereby providing the power supply voltage of the DC power supply 101 to the branch terminals 102a and 102b in the first and second power supply branching controllers 300a and 300b. Furthermore, when the stabilized power supplies 150a and 150b in the first and second power supply branching controllers 300a and 300b generate the control voltage Vcc and the control circuits 170a and 170b generate the energization instruction signal DR0, the gate control circuits 329 for the first and second reverse connection protection devices 320a and 320b start operation as described previously with reference to FIG. 6. When the control circuits 170a and 170b generate the switching instruction signals DR1 and DR2 in response to the operating state of input signals not shown, thereby causing any of the load switching devices 330a and 340a, and 330b and 340b to close, any of the first and second electric loads 107a and 108a, and 107b and 108b connected to the closed load switching device will be powered and driven.

Note that, when a positive-line ground fault abnormality occurs in which the positive-side wire of any of the first and second electric loads 107a and 108a, and 107b and 108b is in fault contact with the ground circuit GND, overcurrent flows in the power supply switching device 310a, corresponding one of the first and second reverse connection protection devices 320a and 320b and the load switching devices 330a and 340a, and 330b and 340b, but, if the load switching devices 330a and 340a, and 330b and 340b have an overcurrent interrupting function, the circuit devices and wires can be prevented from being burnt. This also applies to when an internal short circuit occurs in any of the first and second electric loads 107a and 108a, and 107b and 108b.

On the other hand, when a positive-line supply fault abnormality occurs in which the positive-side wire of any of the first and second electric loads 107a and 108a, and 107b and 108b is in fault contact with the power supply line of the DC power supply 101, for example, when the positive-side wire of the first electric load 107a is in fault contact with the positive-pole wire of the DC power supply 101 and the power supply switching device 310a is opened, if the first reverse connection protection device 320a is conductive in the direction from the drain terminal D to the source terminal S, the supply fault power supply may wraparound toward the second reverse connection protection device 320b, which may enable the second electric loads 107b and 108b to be powered. However, in the first reverse connection protection device 320a, when current flowing from the source terminal S to the drain terminal D becomes equal to or less than a predetermined value, the gate voltage is interrupted due to the effect of the differential amplifier 20 and the control circuit 170a shown in FIG. 6, which prevents wraparound power supply by the supply fault power supply from occurring. Note that, in the third embodiment shown in FIGS. 5 to 7, it is advantageous that the wiring of the first and second electric loads 107a and 108a, and 107b and 108b is needed only on the positive side, but, when a positive-side line supply fault abnormality occurs, even with the power supply interrupted to stop operation, power supply current to an electric load in supply fault accident cannot be interrupted, so an abnormality notification unit not shown is added.

In FIG. 6, when the control circuit 170a generates the energization instruction signal DR0, the leakage current interrupting device 24 is caused to close to form an input circuit of the differential amplifier 20. Accordingly, when power supply current flowing in the current detection resistor 327 and the first reverse connection protection device 320a from the source terminal S to the drain terminal D is equal to or more than a predetermined threshold current, the control circuit 170a outputs the current determination signal DRf having a logic level "H", which causes the drive transistor 325 to close, causing the first reverse connection protection device 320a to be conductive. However, when the power supply current is excessively small, i.e., less than the predetermined threshold current, the drive transistor 325 becomes opened, causing the first reverse connection protection device 320a to be undriven, so the power supply current will flow in the parasitic diode 321a in stead of flowing in the first reverse connection protection device 320a.

When even the excessively small power supply current flows in the parasitic diode 321a, the voltage across the first reverse connection protection device 320a increases, causing the logic level of the current determination signal DRf to be "H". Then, when the first reverse connection protection device 320a is closed, the voltage across the first reverse connection protection device 320a decreases, causing the logic level of the current determination signal DRf to be "L". Accordingly, when the power supply current becomes less than the predetermined threshold current, the first reverse connection protection device 320a is repeatedly opened and closed. However, when the potential of the drain terminal D of the first reverse connection protection device 320a is equal to or more than that of the source terminal S and then reverse current is about to flow, the first reverse connection protection device 320a will not be caused to close, but is kept opened.

In FIG. 7, when the control circuit 170a generates the switching instruction signal DR1 having a logic level "H", the load switching device 330a is caused, through the switching support transistor 335 and the relay transistor 91, to close, causing the load monitoring signal Vx1 from the load voltage monitor device 178a to have a logic level "L" which is invertedly input to the control circuit 170a. When the control circuit 170a generates the switching instruction signal DR1 having a logic level "L", the load switching device 330a is opened, causing the load monitoring signal Vx1 to have a logic level "H", but, if a positive-line supply fault accident has occurred in the first electric load 107a, the load monitoring signal Vx1 is caused to have a logic level "L", then an abnormality will be detected. The load switching device 340a and the switching gate control circuit 349 provide similar effect and operation to the first electric load 108a power-supply controlled by the switching instruction signal DR2.

Figure 8:
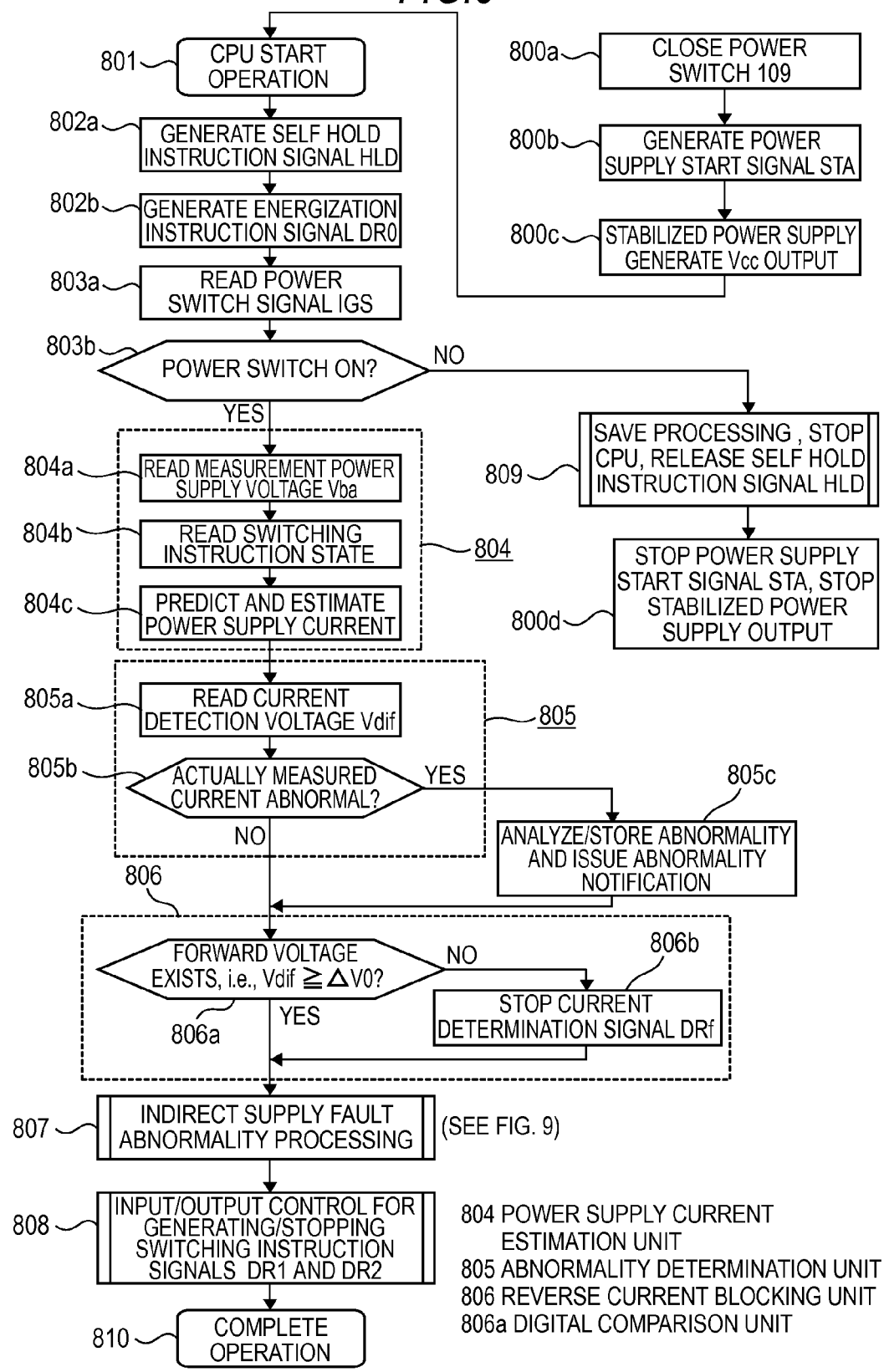
FIG. 8 is a flowchart for describing the operation for FIG. 5.

Next, the flowchart in FIG. 8 for describing the operation for FIG. 5 is described. In FIG. 8, in step 800a, for the control circuit 170a configured as shown in FIG. 5, the power switch 109 is closed. Next, in step 800b, the OR gate 153a generates the power supply start signal STA in response to the closing of the power switch 109. Next, in step 800c, the stabilized power supply 150a is applied with the main power supply voltage Vbb to generate the reference voltage Vcc for supplying power to the control circuit 170a. Next, in step 801, the control circuit 170a is powered to start the microprocessor that starts switching control of the load switching devices connected in series to the electric loads according to a control program stored in the nonvolatile program memory 172 and in response to the operating state of input signals not shown. Next, in step 802a, the self hold instruction signal HLD is generated for the OR gate 153a to keep the operating state of the stabilized power supply 150a even when the power switch 109 is opened. Next, in step 802b, the energization instruction signal DR0 is generated for the support transistor 27 to cause the leakage current interrupting device 24 to close.

Next, in step 803a, the logic state of the power switch signal IGS is read to proceed to step 803b. In the step 803b, it is determined whether the power switch 109 is closed or not, based on the logic level of the power switch signal IGS. If the power switch 109 is closed, YES is determined and the process proceeds to step 804a. If the power switch 109 is not closed, NO is determined and the process proceeds to a block of steps 809. In the step 804a, the measured power supply voltage Vba (FIG. 7) is read to store the current power supply voltage of the DC power supply 101. Next, in step 804b, the generating state of the switching instruction signals DR1 and DR2 is read. Next, in step 804c, in response to the current power supply voltage stored in the step 804a and the logic state of the switching instruction signals DR1 and DR2 read in the step 804b, power supply current that will flow in the first reverse connection protection device 320a is predicted and estimated. A block of steps 804 including the steps 804a-804c is a power supply current estimation unit. Note that the nonvolatile program memory 172 or the nonvolatile data memory 173 previously stores resistances at a reference temperature of the first electric loads 107a and 108a. In step 805a after the step 804c, the current detection voltage Vdif is read to proceed to step 805b.

In the step 805b, the actually measured power supply current read in the step 805a is compared to the power supply current predicted and estimated in the step 804c, and it is determined whether an abnormality has occurred or not, based on whether or not a significant difference exists between the compared currents. If an abnormality has occurred, YES is determined and the process proceeds to step 805c. If no abnormality has occurred, NO is determined and the process proceeds to step 806a. A block of steps 805 including the steps 805a and 805b is an abnormality determination unit. In the step 805c, the abnormality is analyzed and stored based on a list of abnormality determination items described later with reference to FIG. 10, and an abnormality notification is issued. Then, the process proceeds to the step 806a. In the step 806a, the current detection voltage Vdif read in the step 805a is compared to the predetermined determination threshold voltage $\Delta V0$. If Vdif $\geq \Delta V0$, YES is determined and the process proceeds to step 807. If Vdif <$\Delta V0$, NO is determined and the process proceeds to step 806b. Note that the step 806a is a digital comparison unit. In step the 806b, the logic level of the current determination signal DRf is set to "L" to open the drive transistor 325, the relay transistor 91 and the first reverse connection protection device 320a, then the process proceeds to a block of steps 807. A block of steps 806 including the steps 806a and 806b is a reverse current monitoring unit.

Next, a block of steps 807 is a processing step for indirect supply fault abnormality described later with reference to FIG. 9. Note that, in the block 807, whenever the control circuit 170a causes the load switching devices 330a and 340a to open, the control circuit 170a monitors the output voltage of the load switching devices 330a and 340a to determine whether or not an indirect supply fault abnormality has occurred, and if the indirect supply fault abnormality is detected, the control circuit 170a forcibly causes the load switching devices to close until a next instruction to open is generated. A block of steps 808 is an input/output control block in normal operation for generating or stopping the switching instruction signals DR1 and DR2 for the load switching devices 330a and 340a. After the block 808, the process proceeds to step 810 for completing operation. The step 810 for completing operation is configured so that, within, for example, a cycle time of 10 msec at the most after the process executes another control program, the process returns to the step 801 for starting operation to repeatedly perform the steps from the step 801. When NO is determined in the step 803b and it is determined that the power switch 109 is opened, in the block of steps 809, learned information and abnormality occurrence information stored in the RAM memory 171 is transferred to and saved in the nonvolatile data memory 173, then the self hold instruction signal HLD is released. Next, in step 800d, the power supply start signal STA is stopped to stop the operation of the stabilized power supply 150a.

Figure 9:
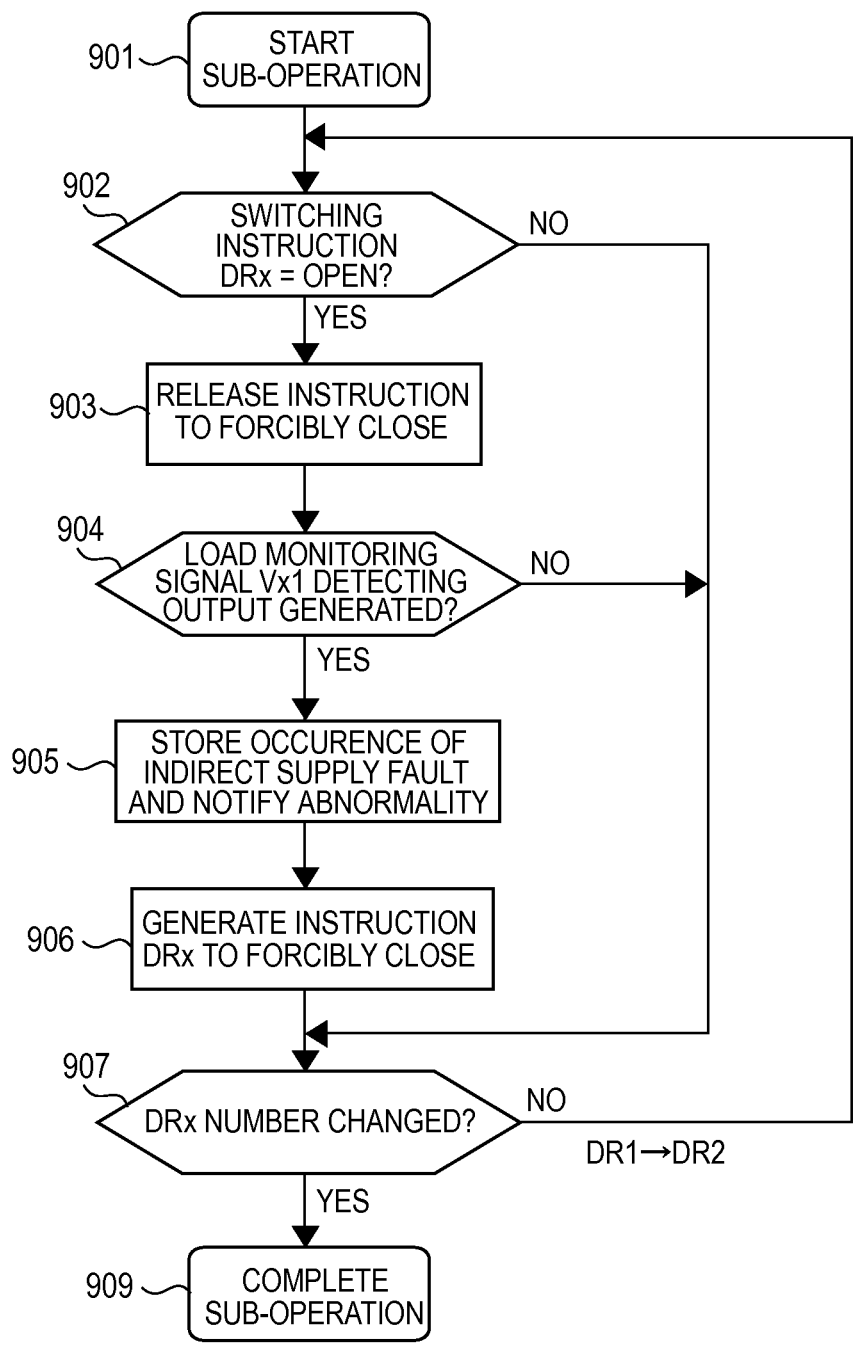
FIG. 9 is a flowchart for describing the operation for a portion of FIG. 8.

Next, the flowchart in FIG. 9 for describing the operation of the indirect supply fault abnormality processing shown as the block of steps 807 in FIG. 8 is described. In FIG. 9, step 901 is a start step of a subroutine program, i.e., a start step of the block of steps 807. Next, step 902 is a determination step in which, of the switching instruction signals DR1 and DR2 for the load switching devices 330a and 340a, first, the logic state of the switching instruction signal DRx=DR1 is determined. If determined that the switching instruction signal DR1 has a logic level "L" to generate an instruction to open the load switching device 330a, YES is determined and the process proceeds to step 903. If determined that the switching instruction signal DR1 has a logic level "H" to generate an instruction to close the load switching device 330a, NO is determined and the process proceeds to step 907. In the step 903, an instruction to forcibly close the load switching device 330a generated in step 906 described later is released. Next, in step 904, if the load monitoring signal Vx1 shown in FIG. 7 has a logic level "L" since the load switching device 330a generates an output voltage, YES is determined and the process proceeds to step 905. If the load monitoring signal Vx1 has a logic level "H" since the load switching device 330a does not generate an output voltage, NO is determined and the process proceeds to step 907.

In the 905, based on the fact that the determination in the step 902 is the instruction for open the load switching device 330a but the determination in the step 904 is the output voltage being generated by the load switching device 330a, it is determined that an indirect supply fault accident has occurred in the output wire of the load switching device 330a, then an abnormality occurrence information is stored and an abnormality notification is issued, and then the process proceeds to the step 906. In the step 906, the switching instruction signal DR1 for the load switching device 330a is forcibly set to a logic level "H", i.e., an instruction to close, to prevent the parasitic diode 331a from being burnt due to the indirect supply fault power supply generated in the output wire of the load switching device 330a wraparounding toward the input side of the load switching device 340a through the parasitic diode 331a.

Next, in step 907, first, NO is determined to return to the step 902 in order to, following the processing for the switching instruction signal DR1, perform supply fault abnormality processing based on the switching instruction signal DR2 and the load switching device 340a and load monitoring signal Vx2 related thereto, then when all of the abnormality determinations for the first electric loads 107a and 108a are completed, YES is determined and the process proceeds to step 909 that is an end step of the subroutine program.

Next, a list of abnormality determination items to be performed in the step 805c in FIG. 8, shown in FIG. 10, is described. In FIG. 10, the upper rows of the list are for the cases in FIG. 1 in which the load switching device is provided at the downstream position of the electric load, and the lower rows are for the cases in FIGS. 3 and 5 in which the load switching device is provided at the upstream position of the electric load. Furthermore, the left columns of the list are for the case in which the switching instruction signals DR1 and DR2 are an instruction to open the load switching device, and the right columns of the list are for the case in which the switching instruction signals DR1 and DR2 are an instruction to close the load switching device. However, in the following, a case in which only the first electric load 107a is used and only the switching instruction signal DR1 is used for the control is described. Here, for a current flowing in the first electric load 107a, a reference value of the current is calculated using a current power supply voltage calculated from the measured power supply voltage Vba and a resistance of the first electric load 107a at a reference temperature stored in the nonvolatile program memory 172 or the nonvolatile data memory 173, and then, considering the fluctuation range of the resistance depending on a current temperature of the first electric load 107a, the minimum current Imin and the maximum current Imax are defined.

The right column of the upper row 1 shows that, in FIG. 1, when the load switching device 230a is closed (with the load switching device 240a opened), the current detection voltage Vdif is excessively small. This is presumably because of a supply fault in the positive-side wire of the first electric load 107a, an abnormality of disconnection in the load switching device 230a or a disconnection in the first electric load 107a. Note that the current detection voltage Vdif will be excessively small also when a supply fault has occurred in the negative-side wire of the first electric load 107a, in which the load switching device 230a is caused to open by the overcurrent interrupting function and the excessively small current detection voltage Vdif is presumably because of an abnormality of disconnection of the load switching device 230a in appearance. The left column of the upper row 1 shows that, in FIG. 1, when the load switching device 230a is opened (with the load switching device 240a opened), the current detection voltage Vdif is excessively small. This is generally a normal state. But, it may also be considered that the abnormality shown in the right column of the upper row 1 has occurred. So, in this case, when the switching instruction signal DR1 is set to an instruction to close, if no abnormality is detected, the determination of the normal state is confirmed.

The right column of the upper row 2 shows that, in FIG. 1, when the load switching device 230a is closed (with the load switching device 240a opened), the current detection voltage Vdif is large. This is a state in which an incomplete short circuit abnormality has occurred in the control circuit 170a. Note that, when a complete short circuit has occurred in the first electric load 107a, the overcurrent interrupting function of the load switching device 230a causes the load switching device 230a to open, causing the current detection voltage Vdif to be excessively small, which is determined to be a disconnection abnormality in the load switching device 230a as shown in the right column of the upper row 1. The left column of the upper row 2 shows that, in FIG. 1, when the load switching device 230a is opened (with the load switching device 240a opened), the current detection voltage Vdif is large. This is determined to be a negative-line ground fault abnormality in the first electric load 107a or a short circuit abnormality in the load switching device 230a.

The right column of the upper row 3 shows that, in FIG. 1, when the load switching device 230a is closed (with the load switching device 240a opened), the current detection voltage Vdif is excessively large. This is a state in which a ground fault abnormality has occurred in the positive-side wire of the first electric load 107a or a short circuit abnormality has occurred in the first electric load 107a. If the positive-line ground fault, the overcurrent interrupting function of the power supply switching device 110a causes the power supply switching device 110a to open. If the short circuit in the electric load, the overcurrent interrupting function of the load switching device 230a causes the load switching device 230a to open. This causes the current detection voltage Vdif to be excessively small and a determination corresponding to the right column of the upper row 1 is performed. The left column of the upper row 3 shows that, in FIG. 1, when the load switching device 230a is opened (with the load switching device 240a opened), the current detection voltage Vdif is excessively large. This is a state in which a ground fault abnormality has occurred in the positive-side wire of the first electric load 107a. In this case, the overcurrent interrupting function of the load switching device 110a causes the load switching device 110a to open, causing the current detection voltage Vdif to be excessively small and a determination corresponding to the left column of the upper row 1 is performed.

The right column of the lower row 1 shows that, in FIGS. 3 and 5, when the load switching device 130a (330a) is closed (with the load switching device 140a (340a) opened), the current detection voltage Vdif is excessively small. This is presumably because of a supply fault in the positive-side wire of the first electric load 107a, an abnormality of disconnection in the load switching device 130a (330a) or a disconnection in the first electric load 107a. The left column of the lower row 1 shows that, in FIGS. 3 and 5, when the load switching device 130a (330a) is opened (with the load switching device 140a (340a) opened), the current detection voltage Vdif is excessively small. This is generally a normal state. But, it may also be considered that the abnormality shown in the right column of the lower row 1 has occurred. So, in this case, when the switching instruction signal DR1 is set to an instruction to close, if no abnormality is detected, the determination of the normal state is confirmed.

The right column of the lower row 2 shows that, in FIGS. 3 and 5, when the load switching device 130a (330a) is closed (with the load switching device 140a (340a) opened), the current detection voltage Vdif is large. This is a state in which an incomplete short circuit abnormality has occurred in the first electric load 107a. Note that, when a complete short circuit has occurred in the first electric load 107a, the overcurrent interrupting function of the load switching device 130a (330a) causes the load switching device 130a (330a) to open, causing the current detection voltage Vdif to be excessively small, which is determined to be a disconnection abnormality of the load switching device 130a (330a) as shown in the right column of the lower row 1. The left column of the lower row 2 shows that, in FIGS. 3 and 5, when the load switching device 130a (330a) is opened (with the load switching device 140a (340a) opened), the current detection voltage Vdif is large. This is determined to be a short circuit abnormality in the load switching device 130a (330a).

The right column of the lower row 3 shows that, in FIGS. 3 and 5, when the load switching device 130a (330a) is closed (with the load switching device 140a (340a) opened), the current detection voltage Vdif is excessively large. This is a state in which a ground fault abnormality has occurred in the positive-side wire of the first electric load 107a or a short circuit abnormality has occurred in the first electric load 107a. Note that, when a positive-line ground fault or a short circuit in the electric load occurs, the overcurrent interrupting function of the load switching device 130a (330a) causes the load switching device 130a (330a) to open, causing the current detection voltage Vdif to be excessively small and a determination corresponding to the right column of the lower row 1 is performed. The left column of the lower row 3 shows that, in FIGS. 3 and 5, when the load switching device 130a (330a) is opened (with the load switching device 140a (340a) opened), the current detection voltage Vdif is excessively large. This corresponds to a case in which a positive-line ground fault or internal short circuit in the first electric load 107a and an internal short circuit in the load switching device 130a (330a) have occurred at the same time. As an actual condition, the overcurrent interrupting function of the load switching device 130a (330a) causes the load switching device 130a (330a) to open, causing the current detection voltage Vdif to be excessively small and a determination corresponding to the right column of the lower row 1 is performed.

In the above description, assuming that the switching instruction signal DR2 is an instruction to open, the switching operation of the load switching device controlled by the switching instruction signal DR1 has been discussed. However, the switching operation of the load switching device controlled by the switching instruction signal DR2 assuming that the switching instruction signal DR1 is an instruction to open is similar to the above. Furthermore, for a case in which the both switching instruction signals DR1 and DR2 are an instruction to close, the determination can be performed in a similar way to the above, using as a reference a power supply current based on a combined resistance of the first electric load 107a and the first electric load 108a or a combined resistance of the second electric load 107b and the second electric load 108b.

As above, in the third embodiment, the comparison between the power supply current and the threshold current is performed using the digital comparison unit 806a including a microprocessor. However, as previously described with reference to FIGS. 1 and 3, the comparison between the power supply current and the threshold current may also be performed using a hardware in which the analog comparator 25 is provided in the gate control circuit 329. Also, for the power supply switching device 310a, the first and second reverse connection protection devices 320a and 320b, and the load switching devices 330a and 340a, and 330b and 340b, an P-channel type field-effect transistor may also be used in place of the N-channel type one.

(3) Aspects and Features of Third Embodiment

As seen from the above description, the power supply branching control apparatus 300 according to a first aspect of the third embodiment is a power supply branching control apparatus 300 for supplying power to electric loads, including: first and second reverse connection protection devices 320a and 320b connected in series to the respective upstream positions of first and second electric loads 107a and 108a, and 107b and 108b connected to and branched from, and powered by a shared power supply switching device 310a connected to the positive-side terminal of a DC power supply 101; load switching devices 330a and 340a, and 330b and 340b also connected in series to the first and second electric loads, respectively; and control circuits 170a and 170b for supplying power supply current to the first and second electric loads through the power supply switching device, the first and second reverse connection protection devices and the load switching devices. The first and second reverse connection protection devices include: a P- or N-channel type field-effect transistor that is connected in a polarity such that the power supply current flows in the forward direction of parasitic diodes 321a and 321b generated between the source terminal S and the drain terminal D of the field-effect transistor; and a gate control circuit 329 for controlling the conduction between the source terminal S and the drain terminal D. The gate control circuit or the control circuit includes an analog comparator 25 or digital comparison unit 806a. When the power supply current flowing in the field-effect transistor in which the parasitic diode is generated is equal to or more than a predetermined threshold current, the analog comparator 25 or digital comparison unit 806a controls gate voltage applied between the source terminal S and the gate terminal G so as to cause the field-effect transistor to close. On the other hand, when the power supply current is less than the predetermined threshold current or at least when the voltage between the source terminal S and the drain terminal D is in a polarity in the reverse direction of the parasitic diode, the analog comparator 25 or digital comparison unit 806a causes the gate voltage to be interrupted and the field-effect transistor to be not conductive.

According to a second aspect of the third embodiment, in response to a current detection voltage Vdif proportional to the voltage across the first and second reverse connection protection devices 320a and 320b or the voltage across the series connection of the reverse connection protection device and a current detection resistor 327, when the current detection voltage Vdif is equal to or more than a determination threshold voltage ΔV0 corresponding to the predetermined threshold current, the gate control circuit 329 causes the first and second reverse connection protection devices to close, and when the current detection voltage Vdif is less than the determination threshold voltage ΔV0, the gate control circuit 329 causes the gate voltage for the first and second reverse connection protection devices to be interrupted so that, at least when the current detection voltage Vdif is in the direction opposite to the forward direction of the parasitic diodes 321a and 321b, the first and second reverse connection protection devices will not be conductive. As above, according to the second aspect, the current detection voltage proportional to the power supply current flowing in the reverse connection protection device is compared to the determination threshold voltage proportional to the predetermined threshold current, and when the power supply current is less than the predetermined value, the reverse connection protection device is opened. Thus a feature similar to those of the first and second embodiments is given.

According to a third aspect of the third embodiment, the gate control circuit 329 includes a drive transistor 325 for causing the first and second reverse connection protection devices 320a and 320b to open or close in response to the current determination signal DRf from the digital comparison unit 806a, and a differential amplifier 20 for generating the current detection voltage Vdif; the input terminals of the differential amplifier 20 are connected to each other via a pair of clip diodes 21; each of the input terminals are connected via input resistors 22a and 23a across the voltage to be measured for measuring the current detection voltage Vdif; a leakage current interrupting device 24 is connected in series to the input resistor 22a on the positive-input side; the leakage current interrupting device 24 is caused to open or close in response to an energization instruction signal DR0 generated by the control circuits 170a and 170b; and when at least the control circuit generates switching instruction signals DR1 and DR2 for the load switching devices 330a and 340a, and 330b and 340b, and the first and second electric loads 107a and 108a, and 107b and 108b are powered, the energization instruction signal DR0 causes the leakage current interrupting device 24 to close. As above, according to the third aspect, the input circuit of the differential amplifier for generating the current detection voltage is protected with the input resistors and the clip diodes so as not to be applied with overvoltage, and when the reverse connection protection device may be opened, the input circuit is interrupted by the leakage current interrupting device. Thus a feature similar to those of the first and second embodiments is given.

(4) Aspects and Features of First to Third Embodiments

As seen from the above description, a power supply branching control method for supplying power to electric loads according to a fifth aspect of the first to third embodiments is such that: control circuits 160a; 160a; 170a, and 160b; 160b; 170b are provided for controlling power supply current supplied to first and second electric loads 107a and 108a, and 107b and 108b, the power supply current being generated by a DC power supply 101, flowing in and branching from a shared power supply switching device 110a; 210a; 310a and then flowing in first and second reverse connection protection devices 120a;120a; 320a, and 120b; 120b; 320b and load switching devices 230a and 240a; 130a and 140a; 330a and 340a, and 230b and 240b; 130b and 140b; 330b and 340b that are P- or N-channel type field-effect transistors; the control circuits include microprocessors that work with RAM memories 161 and 171, nonvolatile program memories 162 and 172, nonvolatile data memories 163 and 173 that are a portion of the nonvolatile program memories or divided from and connected to the nonvolatile program memories, and multi-channel A/D converters 164 and 174; current detection voltages Vdif proportional to power supply current flowing in the first and second reverse connection protection devices to the first and second electric loads are input to the microprocessors through the multi-channel A/D converters; and the microprocessors work with the gate control circuit 129; 129; 329 of the first and second reverse connection protection devices to control gate voltage applied between the source terminal S and the gate terminal G of the field-effect transistors so that, when the power supply current flowing in the field-effect transistors is equal to or more than a predetermined threshold current, the field-effect transistors are caused to close, and when the power supply current is less than the predetermined threshold current or at least when the voltage between the source terminal S and the drain terminal D is in a polarity in the reverse direction of the parasitic diodes 121a; 121a; 321a, and 121b; 121b; 321b generated in the field-effect transistors, the gate voltage is interrupted and the field-effect transistors are caused to be not conductive.

According to a sixth aspect of the first to third embodiments, the nonvolatile program memories 162 and 172 include a control program that works as the digital comparison unit 806a; and when the current detection voltage Vdif is less than a determination threshold voltage $\Delta V0$ corresponding to the predetermined threshold current, the digital comparison unit interrupts the gate voltage to the first and second reverse connection protection devices 120a; 120a; 320a, and 120b; 120b; 320b, and at least when the current detection voltage Vdif is in the direction opposite to the forward direction of the parasitic diode 121a; 121a; 321a, and 121b; 121b; 321b in the first and second reverse connection protection devices, the first and second reverse connection protection devices is caused to be not conductive. As above, according to the sixth aspect, the current detection voltage proportional to the power supply current flowing in the reverse connection protection device is compared to the determination threshold voltage proportional to the predetermined threshold current, and when the power supply current is less than the predetermined value, the reverse connection protection device is opened. So, since the setting of the determination threshold voltage can be easily changed and when to cause the reverse connection protection device to open can be freely set by the microprocessor, the reverse connection protection device can avoid abnormal overheat due to frequently repeated flowing and interrupting of relatively large threshold current.

According to a seventh aspect of the first to third embodiments, the nonvolatile program memories 162 and 172 include a control program that works as the power supply current estimation unit 804 and the abnormality determination unit 805; the nonvolatile program memories 162 and 172 or the nonvolatile data memories 163 and 173 previously stores the resistances at a reference temperature of the first and second electric loads 107a and 108a, and 107b and 108b; the power supply current estimation unit 804 estimates the amount of the power supply current flowing in the first and second reverse connection protection devices 120a; 120a; 320a, and 120b; 120b; 320b from the generating state of the switching instruction signals DR1 and DR2 for the load switching device 230a and 240a; 130a and 140a; 330a and 340a, and 230b and 240b; 130b and 140b; 330b and 340b connected in series to the first and second electric loads, respectively, and the resistances of the electric loads; and the abnormality determination unit 805 compares the current power supply current calculated from the current detection voltage Vdif to the predicted power supply current estimated by the power supply current estimation unit 804 to determine whether or not an abnormality of supply fault, ground fault, disconnection or short circuit has occurred in any of the load switching device, the load wiring or the electric load. As above, according to the seventh aspect, by estimating the power supply current to the electric load in response to the generating state of the switching instruction signal for the load switching device and comparing the estimated power supply current to the current detection voltage Vdif proportional to the measured power supply current, it is determined whether or not a supply fault or ground fault abnormality has occurred in the load wiring, whether or not a disconnection or short circuit abnormality has occurred in the load switching device or whether or not a disconnection or short circuit abnormality has occurred in the electric load. So, an abnormality determination for the power supply branching control apparatus for supplying power to electric loads can be performed, not only with the reduced number of power supply switching devices but also with the aid of reverse connection protection devices connected to and branched from the power supply switching devices.

According to a eighth aspect of the third embodiment, any one or both of the first and second electric loads include a plurality of electric loads 107a and 108a, and 107b and 108b powered and driven through any of a plurality of load switching devices 330a and 340a, and 330b and 340b connected in series to and branched from the downstream positions of the first and second reverse connection protection devices 320a and 320b; the plurality of load switching devices include a P- or N-channel type field-effect transistor that is connected in a polarity such that the power supply current flows in the direction opposite to the forward direction of parasitic diodes 331a and 341a, and 331b and 341b generated between the source terminal S and the drain terminal D of the field-effect transistor, and switching gate control circuits 339 and 349 for controlling the conduction between the source terminal S and the drain terminal D in response to the switching instruction signals DR1 and DR2 provided to the plurality of load switching devices, respectively; the nonvolatile program memory 172 includes a control program that works as the indirect supply fault detection unit 904 and the forcible closing instruction unit 906; the indirect supply fault detection unit 904 monitors the output voltage of the plurality of load switching devices whenever the switching instruction signals DR1 and DR2 become an instruction to open, and when an output voltage is generated with any of the load switching devices opened, determines that an indirect supply fault abnormality has occurred in which the output wire of the load switching device in question is in fault contact with the positive-pole wire of the DC power supply 101; and when the indirect supply fault detection unit 904 detects the occurrence of the indirect supply fault abnormality, the forcible closing instruction unit 906 works to forcibly cause the load switching device in question to close until the switching instruction signals DR1 and DR2 become an instruction to open again.

As above, according to the eighth aspect of the third embodiment, whenever the load switching devices are caused to open, it is determined whether or not an indirect supply fault has occurred in the output wire of any of the load switching devices, and if the indirect supply fault is detected, the load switching device in question is forcibly caused to close until a next instruction to open is generated. Thus, avoiding a power supply to another electric load through an internal parasitic diode of the load switching device in which an indirect supply fault abnormality has occurred and providing reverse conduction between the drain terminal D and the source terminal S of the forcibly closed load switching device enables significant reduction in temperature increase of the load switching device in question.

Note that, according to the invention, any two or more of the embodiments may be freely combined and any of the embodiments may be appropriately modified or omitted within the scope of the invention.

Various modifications and alterations of this invention will be apparent to those skilled in the art without departing from the scope and spirit of this invention, and it should be understood that this invention is not limited to the illustrative embodiments set forth herein.

What is claimed is:

1. A power supply branching control apparatus for supplying power to electric loads comprising: first and second reverse connection protection devices connected in series to the respective upstream positions of first and second electric loads connected to and branched from, and powered by a shared power supply switching device connected to the positive-side terminal of a DC power supply; load switching devices also connected in series to the first and second electric loads, respectively; and control circuits for supplying power supply current to the first and second electric loads through the power supply switching device, the first and second reverse connection protection devices and the load switching devices, wherein the first and second reverse connection protection devices include: a P- or N-channel type field-effect transistor that is connected in a polarity such that the power supply current flows in the forward direction of parasitic diodes generated between the source terminal S and the drain terminal D of the field-effect transistor; and a gate control circuit for controlling the conduction between the source terminal S and the drain terminal D, and wherein the gate control circuit or the control circuit includes an analog comparator or digital comparison unit so that, when the power supply current flowing in the field-effect transistor in which the parasitic diode is generated is equal to or more than a predetermined threshold current, the analog comparator or digital comparison unit controls gate voltage applied between the source terminal S and the gate terminal G so as to cause the field-effect transistor to close, and when the power supply current is less than the predetermined threshold current or at least when the voltage between the source terminal S and the drain terminal D is in a polarity in the reverse direction of the parasitic diode, the analog comparator or digital comparison unit causes the gate voltage to be interrupted and the field-effect transistor to be not conductive.

2. The power supply branching control apparatus for supplying power to electric loads according to claim 1, wherein, in response to a current detection voltage Vdif proportional to the voltage across the first and second reverse connection protection devices or the voltage across the series connection of the reverse connection protection device and a current detection resistor, when the current detection voltage Vdif is equal to or more than a determination threshold voltage AVO corresponding to the predetermined threshold current, the gate control circuit causes the first and second reverse connection protection devices to close, and when the current detection voltage Vdif is less than the determination threshold voltage $\Delta V0$, the gate control circuit causes the gate voltage for the first and second reverse connection protection devices to be interrupted so that, at least when the current detection voltage Vdif is in the direction opposite to the forward direction of the parasitic diodes, the first and second reverse connection protection devices will not be conductive.

3. The power supply branching control apparatus for supplying power to electric loads according to claim 2, wherein the gate control circuit includes a drive transistor for causing the first and second reverse connection protection devices to open or close in response to a current determination signal DRf from the analog comparator or digital comparison unit, and a differential amplifier for generating the current detection voltage Vdif; wherein the input terminals of the differential amplifier are connected to each other via a pair of clip diodes, wherein each of the input terminals are connected via input resistors across the voltage to be measured for measuring the current detection voltage Vdif, wherein a leakage current interrupting device is connected in series to the input resistor on the positive-input side, wherein the leakage current interrupting device is caused to open or close in response to an energization instruction signal DR0 generated by the control circuits, and wherein, when at least the control circuit generates switching instruction signals DR1 and DR2 for the load switching devices, and the first and second electric loads are powered, the energization instruction signal DR0 causes the leakage current interrupting device to close.

4. The power supply branching control apparatus for supplying power to electric loads according to claim 1, wherein any one or both of the first and second electric loads include a plurality of electric loads powered and driven through any of a plurality of load switching devices connected in series to and branched from the downstream positions of the first and second reverse connection protection devices, wherein the plurality of load switching devices include a P- or N-channel type field-effect transistor that is connected in a polarity such that the power supply current flows in the direction opposite to the forward direction of parasitic diodes generated between the source terminal S and the drain terminal D of the field-effect transistor, and switching gate control circuits for controlling the conduction between the source terminal S and the drain terminal D in response to the switching instruction signals DR1 and DR2 provided to the plurality of load switching devices, respectively, and wherein the switching gate control circuits includes a switching signal processing circuit that monitors the output voltage of the plurality of load switching devices whenever the switching instruction signals DR1 and DR2 become an instruction to open, and when an output voltage is generated with any of the load switching devices opened, determines that an indirect supply fault abnormality has occurred in which the output wire of the load switching device in question is in fault contact with the positive-pole wire of the DC power supply, then, when the occurrence of the indirect supply fault abnormality is detected, forcibly causes the load switching device in question to close until the switching instruction signals DR1 and DR2 become an instruction to open again.

5. The power supply branching control apparatus for supplying power to electric loads according to claim 2, wherein any one or both of the first and second electric loads include a plurality of electric loads powered and driven through any of a plurality of load switching devices connected in series to and branched from the downstream positions of the first and second reverse connection protection devices, wherein the plurality of load switching devices include a P- or N-channel type field-effect transistor that is connected in a polarity such that the power supply current flows in the direction opposite to the forward direction of parasitic diodes generated between the source terminal S and the drain terminal D of the field-effect transistor, and switching gate control circuits for controlling the conduction between the source terminal S and the drain terminal D in response to the switching instruction signals DR1 and DR2 provided to the plurality of load switching devices, respectively, and wherein the switching gate control circuits includes a switching signal processing circuit that monitors the output voltage of the plurality of load switching devices whenever the switching instruction signals DR1 and DR2 become an instruction to open, and when an output voltage is generated with any of the load switching devices opened, determines that an indirect supply fault abnormality has occurred in which the output wire of the load switching device in question is in fault contact with the positive-pole wire of the DC power supply, then, when the occurrence of the indirect supply fault abnormality is detected, forcibly causes the load switching device in question to close until the switching instruction signals DR1 and DR2 become an instruction to open again.

6. The power supply branching control apparatus for supplying power to electric loads according to claim 3, wherein any one or both of the first and second electric loads include a plurality of electric loads powered and driven through any of a plurality of load switching devices connected in series to and branched from the downstream positions of the first and second reverse connection protection devices, wherein the plurality of load switching devices include a P- or N-channel type field-effect transistor that is connected in a polarity such that the power supply current flows in the direction opposite to the forward direction of parasitic diodes generated between the source terminal S and the drain terminal D of the field-effect transistor, and switching gate control circuits for controlling the conduction between the source terminal S and the drain terminal D in response to the switching instruction signals DR1 and DR2 provided to the plurality of load switching devices, respectively, and wherein the switching gate control circuits includes a switching signal processing circuit that monitors the output voltage of the plurality of load switching devices whenever the switching instruction signals DR1 and DR2 become an instruction to open, and when an output voltage is generated with any of the load switching devices opened, determines that an indirect supply fault abnormality has occurred in which the output wire of the load switching device in question is in fault contact with the positive-pole wire of the DC power supply, then, when the occurrence of the indirect supply fault abnormality is detected, forcibly causes the load switching device in question to close until the switching instruction signals DR1 and DR2 become an instruction to open again.

* * * * *